(12) United States Patent
Oversluizen et al.

(10) Patent No.: US 8,243,230 B2
(45) Date of Patent: Aug. 14, 2012

(54) IMAGE DISPLAY APPARATUS, AND DISGUISING DEVICE

(75) Inventors: Gerrit Oversluizen, Eindhoven (NL);
Hendrik De Koning, Eindhoven (NL);
Ronald Van Rijswijk, Eindhoven (NL);
Eefje Janet Hornix, Eindhoven (NL);
Cornelis Teunissen, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 375 days.

(21) Appl. No.: 12/528,149

(22) PCT Filed: Feb. 21, 2008

(86) PCT No.: PCT/IB2008/050627
§ 371 (c)(1),
(2), (4) Date: Aug. 21, 2009

(87) PCT Pub. No.: WO2008/104905
PCT Pub. Date: Sep. 4, 2008

(65) Prior Publication Data
US 2010/0014319 A1    Jan. 21, 2010

(30) Foreign Application Priority Data
Feb. 28, 2007    (EP) .................................... 07103202

(51) Int. Cl.
*G02F 1/1335*    (2006.01)
(52) U.S. Cl. ........................................ 349/63
(58) Field of Classification Search ...................... 349/63
See application file for complete search history.

(56) References Cited

U.S. PATENT DOCUMENTS

| | | | |
|---|---|---|---|
| 4,715,137 A | 12/1987 | Scheve | |
| 5,506,704 A | 4/1996 | Broer et al. | |
| 5,793,456 A | 8/1998 | Broer et al. | |
| 5,948,831 A | 9/1999 | Broer et al. | |
| 6,193,937 B1 | 2/2001 | Broer et al. | |
| 6,742,921 B2 * | 6/2004 | Umemoto et al. | 362/561 |
| 7,292,296 B2 * | 11/2007 | Kanbe et al. | 349/114 |

(Continued)

FOREIGN PATENT DOCUMENTS

JP    2005321635 A    11/2005
(Continued)

OTHER PUBLICATIONS

H. Jagt: "Polymeric Polarization Optics for Energy Efficient Liquid Crystal Display Illumination", PHD Thesis, 2001, Chapter 2, pp. 13-29.
Broer et al: "Wide-Band Reflective Polarizers From Cholesteric Polymer Networks With a Pitch Gradient"; Nature, vol. 378, Issue 6556,, 1995, pp. 467-469.

*Primary Examiner* — James Dudek
(74) *Attorney, Agent, or Firm* — Shimokaji & Assoc., PC

(57) ABSTRACT

An image display apparatus including a display device for displaying an image by emission of display light in a first direction; a scattering layer disposed in front of the display device, for scattering at least a portion of ambient light; a transparent plate-shaped light source, arranged parallel to the scattering layer and being optically coupled to the scattering layer. The plate-shaped light source may be a passive light source, in which case at least one light source is arranged along an edge of the plate-shaped light source. When the display device is ON, the scattering layer and the plate-shaped light source are transparent. When the display device is OFF, the scattering layer is scattering and the plate-shaped light source is ON.

21 Claims, 15 Drawing Sheets

U.S. PATENT DOCUMENTS

| | | |
|---|---|---|
| 2004/0125234 A1 | 7/2004 | Kim |
| 2005/0105303 A1 | 5/2005 | Emde |
| 2006/0162057 A1 | 7/2006 | Pratt |
| 2007/0024822 A1 | 2/2007 | Cortenraad et al. |

FOREIGN PATENT DOCUMENTS

| | | |
|---|---|---|
| KR | 20040063887 A | 7/2004 |
| WO | 0190637 A1 | 11/2001 |
| WO | 2007015192 A2 | 2/2007 |

* cited by examiner

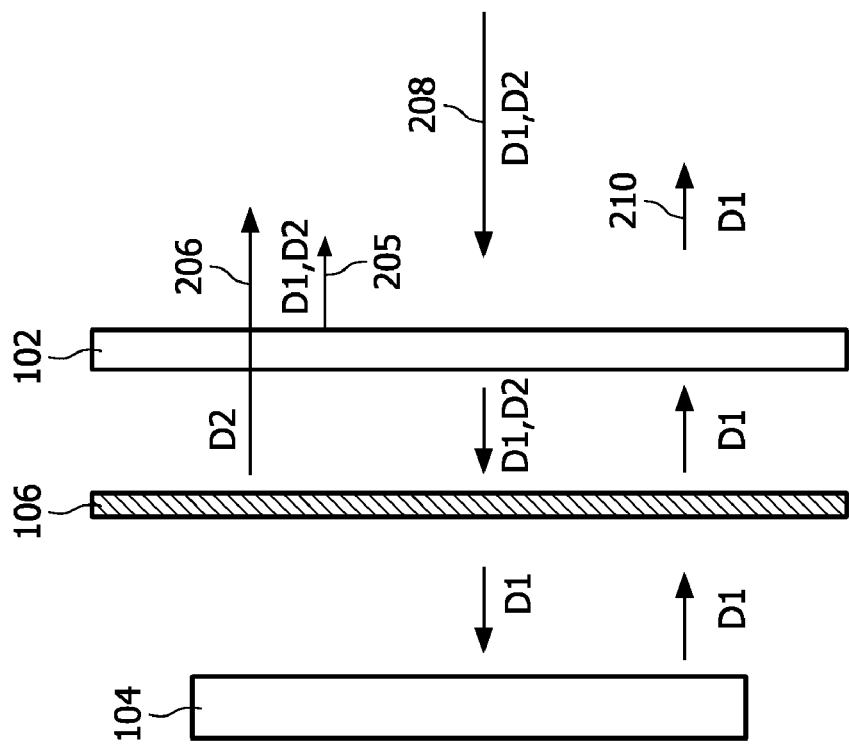
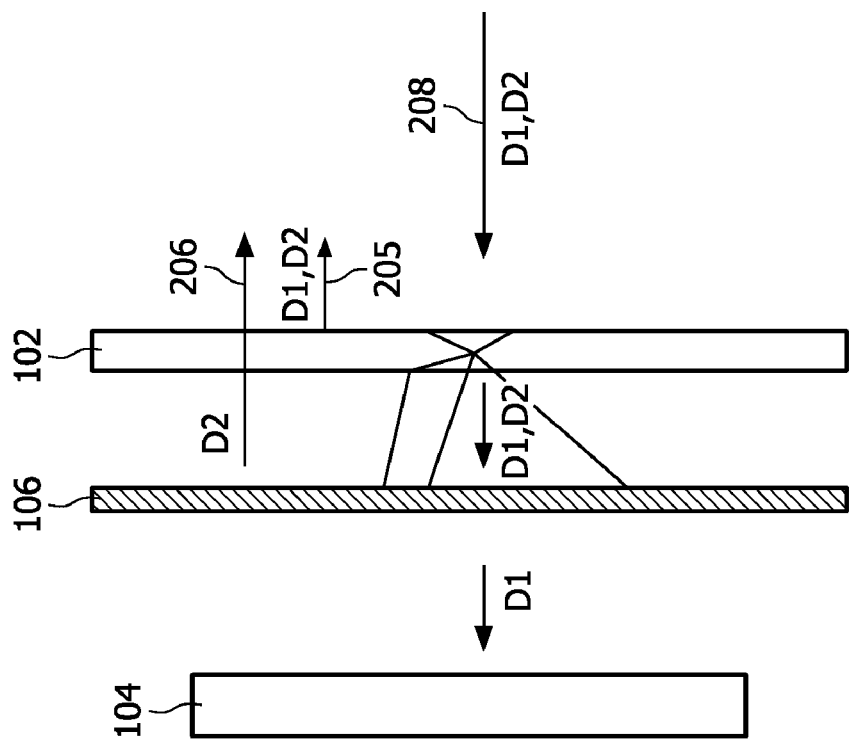

IMAGE DISPLAY APPARATUS, AND DISGUISING DEVICE

FIELD OF THE INVENTION

The present invention relates in general to an image display apparatus comprising a display device and a disguising device disposed in front of the display device. The present invention also relates to a disguising device.

BACKGROUND OF THE INVENTION

Image display apparatus comprising a display device are known. Conventional examples of a display device include cathode ray tube type of image screen, more recent developments include LCD screens, plasma screens, etc. A major complaint with respect to especially large display apparatus is their non-aesthetic appearance when they are not in use. This hinders acceptance in consumers' homes. It is within the philosophy of some designers and interior architects to develop concepts where the display device is disguised by a static or dynamic architectural object. In other words unobtrusive design is considered to be relevant.

Ambient displays is the overall name for display apparatus that can display information in the on-state and are a decorative part of their environment in the off-state e.g. similar appearance as the wall in front of which the display apparatus is located. Typically, the display device of a display apparatus comprises light absorbing materials. The result is that the display apparatus looks like a "black hole" when it is turned off.

In order to prevent that "black hole" appearance it is proposed to provide the display apparatus with a disguising device arranged in front of the display device, i.e. at the viewing side of the display device. Such disguising device comprises a scattering layer, arranged to scatter a portion of the ambient light which falls on the scattering layer. With ambient light is meant, light that originates from any light source which does not belong to the display apparatus. The light source may be a lamp in the room in which the display apparatus is located. Ambient light may also be sun light coming through the windows of the room in which the display apparatus is located. With scattering is meant that light is directed in random directions. Scattering also comprises diffuse reflection. The effect of diffuse reflection is that a portion of the ambient light is directed in a forward direction, i.e. in the direction of a viewer of the display apparatus. Hence, the ambient light which falls on the display apparatus is no longer completely absorbed, because it is also partly reflected. Thus, as a result, the "black hole" appearance is substantially prevented.

The scattering layer may be arranged at some distance from the display device. However, it is preferred that the scattering layer is in close contact with the display device in order to obtain a thin display apparatus.

When investigating various types of materials it was found that currently commercially available scattering layers (PDLC, CTLC, polymer network LC based) do not offer sufficient hiding power to make the display device substantially invisible in its off state under the condition that the display device and the scattering layer are in relatively close contact. Depending on the type of effect and the thickness of the scattering layer the distance between the display device and scattering layer needed to be at least 4 cm.

Increasing the thickness of the scattering layer would improve the hiding power in some extend, and would result in a smaller distance between the display device and the scattering layer. However, the drawback of increasing the thickness of this scattering layer is an increase in the driving voltage. In addition the transmissive state will have a reduced transmission, and more residual haze.

It is an object of the invention to provide a display apparatus of the kind described in the opening paragraph with an improved hiding effect.

SUMMARY OF THE INVENTION

According to a preferred aspect of the invention, the disguising device further comprises a reflective member disposed in between the display device and the scattering layer for reflecting a portion of the scattered ambient light into the first direction. The reflective member is preferably of influence for the light transmitted by the scattering layer and not for the light emitted by the display, thus not having a negative effect on the image quality and display luminance.

According to the invention, the higher the reflectivity of the reflective member the better the disguising effect of the disguising device. However, when the display device is on, the disguising device should preferably not be noticed, but increased reflectivity typically involves reduced transmissivity. The invention further aims to reduce this problem. Specifically, the present invention aims to providing embodiments of the disguising device which have good performance in the disguising effect when the display device is off and have good performance in transmitting the light from the display device when the display device is on.

To this end, the scattering layer is provided with a transparent, plate-shaped light source.

Further advantageous elaborations are mentioned in the dependent claims.

In a particular embodiment of the image display apparatus according to the invention, the scattering layer is comprised in a scattering device further comprising electrical means for controlling the amount of scattering by the scattering layer. This embodiment of the display device according to the invention comprises a so-called active scattering layer. The amount of light scattering by the scattering layer is preferably related to a voltage difference across the scattering layer, which is created by electrodes at opposite sides of the scattering layer. Preferably the electrodes are highly transparent and may comprise indium tin oxide (ITO) but can occasionally also be indium zinc oxide (IZO) also known to those skilled in the field as a transparent electrode. Preferably the square resistance of the transparent electrodes is sufficiently low to minimize the required voltage between the two electrodes needed to switch between different states.

Preferably the scattering device is arranged to switch between a first state in which hardly any scattering of light takes place and a second state in which the scattering of light is relatively strong. Typically, the first state corresponds to the turned on state of the display device while the second state corresponds to the turned off state of the display device. Preferably, a voltage difference across the scattering layer is minimal for the first state resulting in no energy consumption during the periods in which the display device is turned off.

In a particularly preferred embodiment, the scattering device is a switchable device and the reflective member is a switchable device, wherein the scattering device and the reflective member are switched simultaneously.

In another embodiment of the image display apparatus according to the invention, the scattering layer is a scattering polarizer, which is substantially transmissive for the display light having a first polarization direction and which is arranged to scatter the portion of the ambient light having a second polarization direction being orthogonal to the first direction. This embodiment of the display apparatus according to the invention comprises a so-called passive scattering layer, meaning that the amount of scattering is predetermined and cannot be controlled during operation of the display apparatus. A scattering polarizer is a material which has different behavior for respective polarization directions. The scattering polarizer is substantially transparent for light having a first polarization direction and is arranged to scatter light having a second polarization direction which is orthogonal with the first polarization direction. An example of the scattering polarizer is described in the PhD thesis of Henri Jagt, "Polymeric polarization optics for energy efficient liquid crystal display illumination", 2001, Chapter 2 and in patent application WO01/90637.

In an embodiment of the image display apparatus according to the invention, the reflective layer is a semi transparent mirror. Unfortunately, the transmission of the display light, i.e. the information shown on the display device will be effected. A possible remedy against this is increasing the light output of the display device.

In another embodiment of the image display apparatus according to the invention, the reflective layer is a polarizer which is substantially transparent for the display light having a first polarization direction. The reflective polarizer can be a stack of alternating birefringent and non-birefringent layers in a periodicity that enables Bragg reflection for the second polarization direction and provides transmission for the orthogonal, i.e. first polarization direction. Preferably, the transmissive state of the polarizer is chosen to be parallel to the polarization of the emitted display light which especially works with a liquid crystal based display device that is provided with dichroic polarizers to generate the image. An example of a reflective polarizer that is based on this principle is a polarizer film supplied by 3M company under the name of Vikuity™ Dual Brightness Enhancement Films (DBEF).

Another way of making reflective polarizers is based on cholesteric films as described in U.S. Pat. No. 5,506,704, U.S. Pat. No. 5,793,456, U.S. Pat. No. 5,948,831, U.S. Pat. No. 6,193,937 and in 'Wide-band reflective polarizers from cholesteric polymer networks with a pitch gradient', D. J Broer, J. Lub, G. N. Mol, Nature 378 (6556), 467-9 (1995). In combination with a quarter wave film this film provides the same optical function as DBEF.

Alternatively the reflective polarizer is based on the so-called wire grid principle where narrow periodic lines of a metal with a periodicity smaller than the wavelength of light are applied on a glass or plastic substrate.

Preferably, the reflective layer is a scattering polarizer, which is arranged to reflect the portion of the scattered ambient light having a second polarization direction being orthogonal to the first direction. The scattering polarizer is aligned with the display device such that display light emitted by the display device, which has the first polarization direction, is transmitted without substantial negative effect.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which:

FIG. 1B shows the front view of the embodiment of the image display apparatus of FIG. 1A when the display device is turned on;

FIG. 8A schematically shows the passing of light rays in an embodiment of the display apparatus according to the invention, whereby the display device is turned off;

FIG. 8B schematically shows the passing of light rays in the embodiment of the display apparatus according to the invention of FIG. 8A, whereby the display device is turned on;

The Figures are diagrammatic and not drawn to scale.

DETAILED DESCRIPTION OF THE INVENTION

Figure 2:
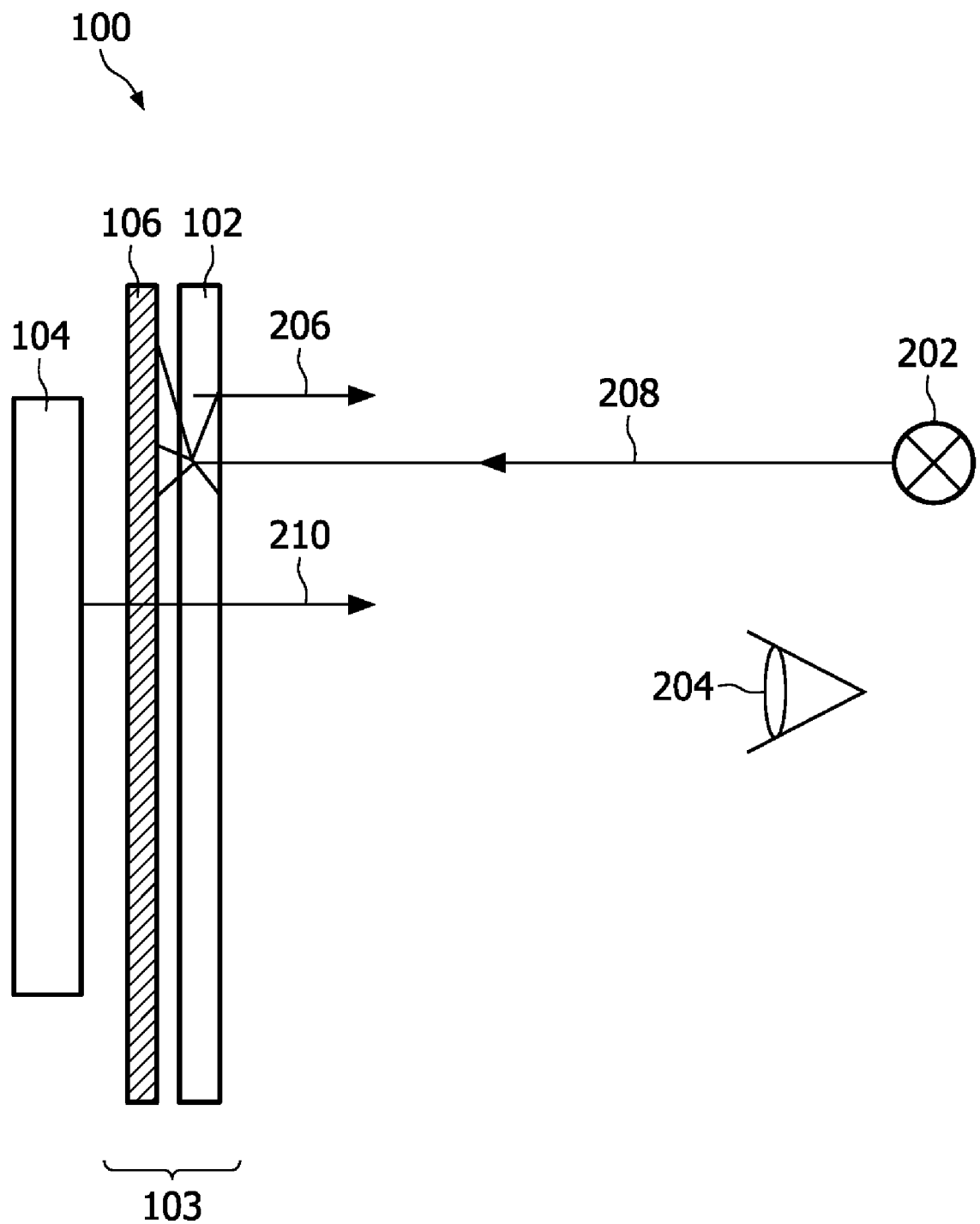
FIG. 2 schematically shows an embodiment of the display apparatus according to the invention.

FIG. 2 schematically shows a side view of an image display apparatus 100, comprising a display device 104 and a disguising device 103 arranged in front of the display device 104, which disguising device 103, in this embodiment, comprises a scattering layer 102 and a reflective member 106. A viewing person is schematically indicated at 204. The display device 104 is arranged for displaying an image, by emission of display light 210 in a first direction, i.e. from the display device 104 towards the viewing person 204. An ambient light source 202 generates ambient light 208. The scattering layer 102 is arranged for scattering a portion of the ambient light 208. The reflective member 106, which is located behind the scattering layer 102 as seen from the viewer 204, is arranged for reflecting a portion of the scattered ambient light 206 into the first direction.

Figure 1A:
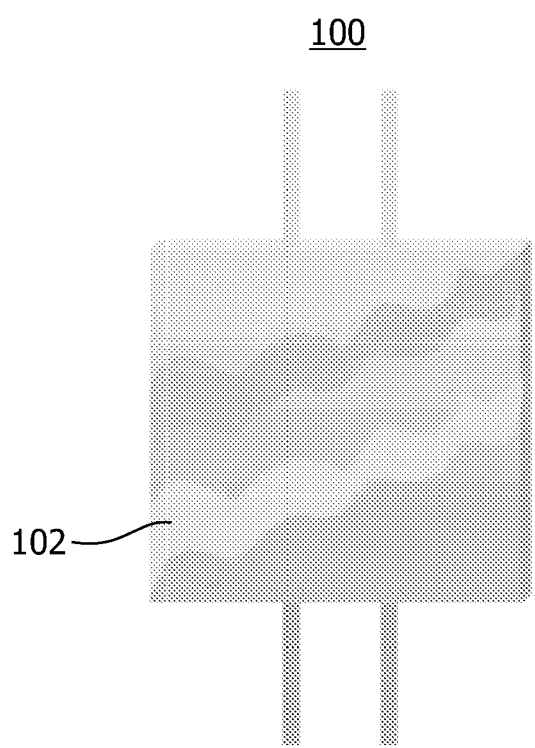
FIG. 1A shows a front view of an embodiment of the image display apparatus when the display device is turned off.

FIG. 1A shows a front view of the image display apparatus 100 when the display device 104 is turned off. Basically, the viewer 204 sees a preferably flat surface with dimensions that are equal to the respective dimensions of the image display apparatus. The flat surface belongs to the scattering layer 102. The scattering layer 102 is arranged to randomly direct and hence reflect at least a portion of the ambient light. The display device 104, which is located behind the scattering layer 102, is substantially invisible for the viewer 204 as long as the display device 104 is turned off.

The scattering layer 102 may be homogeneous in color, i.e. may have a single color. Preferably, the scattering layer 102 has multiple colors representing a predetermined texture. That means that at a first region of the scattering layer 102 a dye with a first color is located while at a second region of the scattering layer 102 a dye with a second color is located.

Figure 1B:
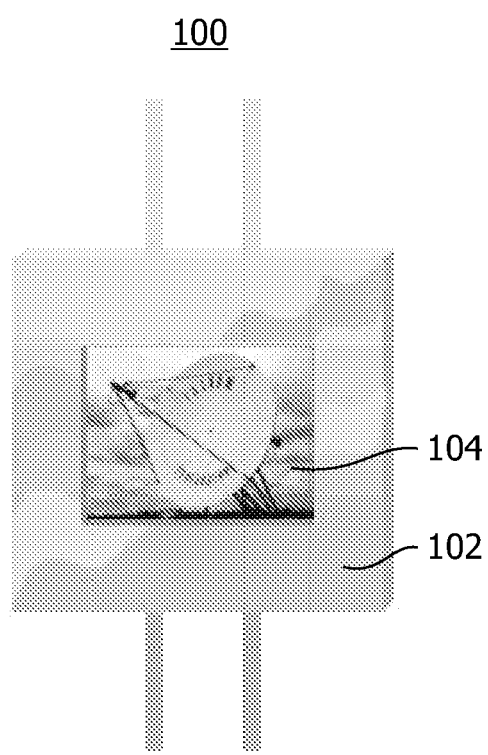

FIG. 1B shows the front view of this image display apparatus when the display device 104 is turned on. Now the display light 210 (see FIG. 2) being emitted by the display device 104 in the first direction passes the scattering layer 102 and can be observed by the viewer 204 that is located in front of the image display apparatus 100. Preferably, the image display apparatus 100 according to the invention is arranged to reduce the amount of scattering of ambient light if the display device 104 is turned on, i.e. producing display light. However, even if the amount of scattering of ambient light is not reduced if the display device 104 is turned on, the image being rendered on the display device 104 will be clearly visible as long as the amount of emitted display light is relatively high compared to the amount of scattered and reflected ambient light.

Thus, the viewer 204 is provided with:
  light which originates from the display device 104, so-called display light 210, and which moves in the first direction towards the viewer 204; and/or
  scattered ambient light 206 which originates from the ambient light source 202 (direct and/or indirect) and which is scattered by the scattering layer 102 and optionally reflected by the reflection layer 106.

Preferably, the viewer is only provided with display light 210 if the display device 104 is turned on, i.e. is active. To realize this, the scattering layer 102 is comprised in a scattering device 600 (see FIG. 6) which is arranged to limit the amount of scattered ambient light 206 under predetermined conditions. Alternatively, the scattering layer 102 is passive.

Figure 3:
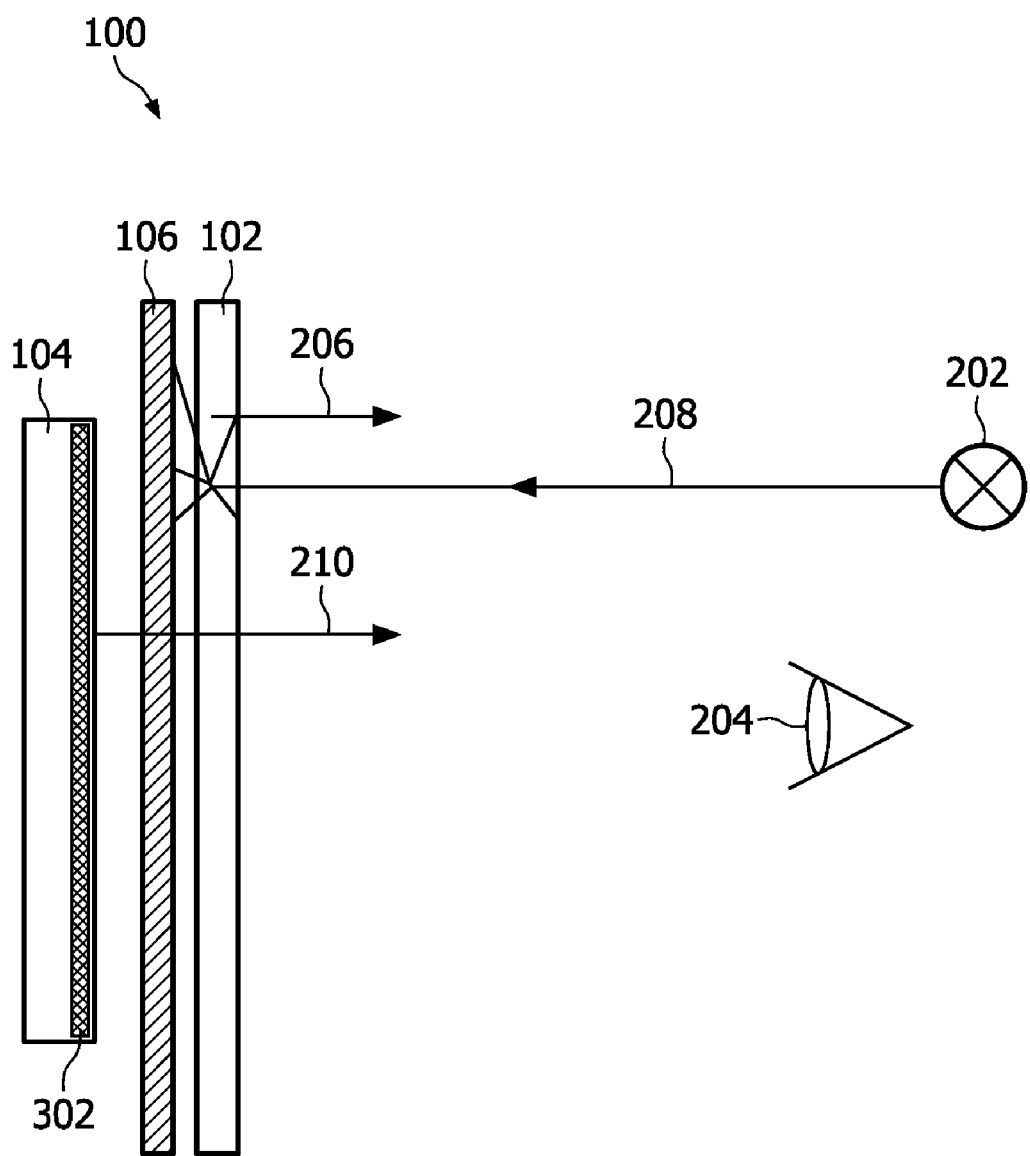
FIG. 3 schematically shows an embodiment of the display apparatus according to the invention, wherein the display device is an LCD device.

FIG. 3 schematically shows an embodiment of the display apparatus according to the invention as described in connection with FIG. 2, wherein the display device 104 is an LCD device. Although the display apparatus according to the invention may comprise any type of display device 104, some of the technical features of the invention perfectly match with characteristics of an LCD device. In conjunction with the figures it is disclosed that several types of polarizers are applied. With a polarizer is meant an optical element which filters a light ray depending on the polarization directions of the respective components of the light ray. Typically, a polarizer is substantially transmissive for components of the light ray having a first polarization direction D1 (see FIG. 8) while the polarizer is substantially influencing components of the light ray having a second polarization direction D2 which is orthogonal with the first polarization direction D1. Influencing in this context comprises scattering and absorbing.

Suppose that the LCD device of the display device 104 according to the invention comprises a polarizer 302 which is arranged to be substantially transmissive for light having the first polarization direction D1. Then the various polarizers which are applied in the different embodiments of the display apparatus according to the invention are preferably aligned with the polarizer 302 of the display device 104 such that the emitted display light can pass the various polarizers without any substantial effect. However, the components of the ambient light 208 and the scattered ambient light 206 having the second polarization direction D2 will be substantially affected by the various polarizers. The various polarizers may be used for the following functions:
  in an embodiment of the display apparatus according to the invention a polarizer is used as scattering layer 102;
  in an embodiment of the display apparatus according to the invention a polarizer is used as reflecting layer 106; and
  in an embodiment of the display apparatus according to the invention a polarizer is used as optical absorption means 402.

Figure 4A:
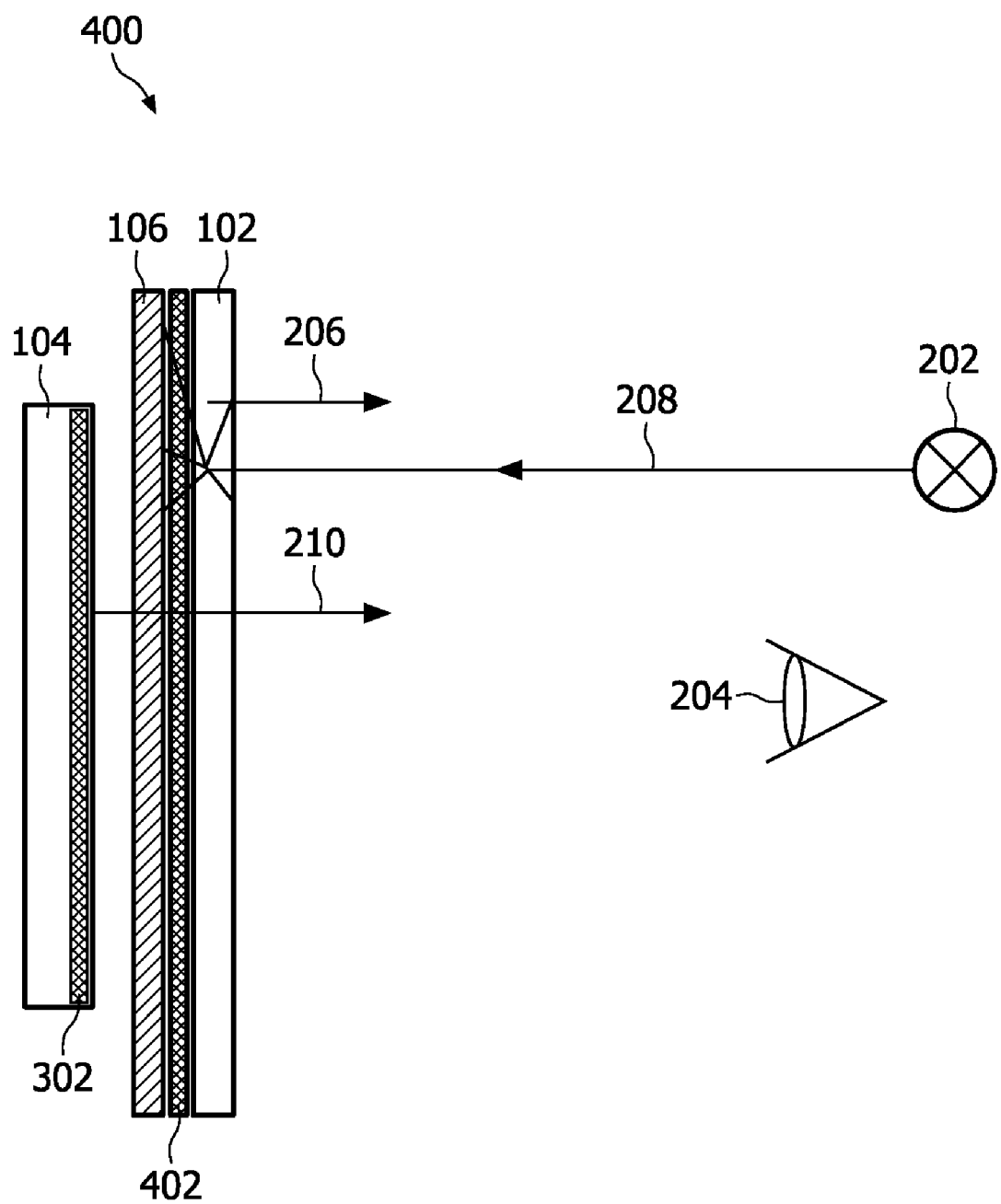
FIG. 4A schematically shows an embodiment of the display apparatus according to the invention comprising an absorption polarizer disposed between the scattering layer and the reflection layer.

FIG. 4A schematically shows an embodiment of the display apparatus 400 according to the invention comprising an absorption polarizer 402 disposed between the scattering layer 102 and the reflection layer 106. The absorption polarizer 402 is arranged to absorb a portion of the scattered ambient light 206. More precisely, the absorption polarizer 402 is arranged to absorb the components of the ambient light having the second polarization direction D2. The reason is as follows.

A negative effect of the reflective layer 106 is a reduction of the image display contrast due to more reflection of ambient light 208. In other words, because of the scattering and reflection of ambient light by the display apparatus of the invention, the viewer 204 receives not only the display light 210 but also reflected ambient light. This is especially noticeable in dark scenes of the video content, i.e. when the amount of emitted display light 210 is relatively low. By applying an absorption polarizer 402, as optical absorption means 402, in front of the reflection layer 106 the reflection can be reduced. To achieve the required effect, the absorption polarizer 402 is arranged to absorb the components of the scattered ambient light 206 having the polarization direction D2 which would have been reflected by the reflective layer 106. Preferably, the reflective layer 106 is also based on a polarizer.

Figure 4B:
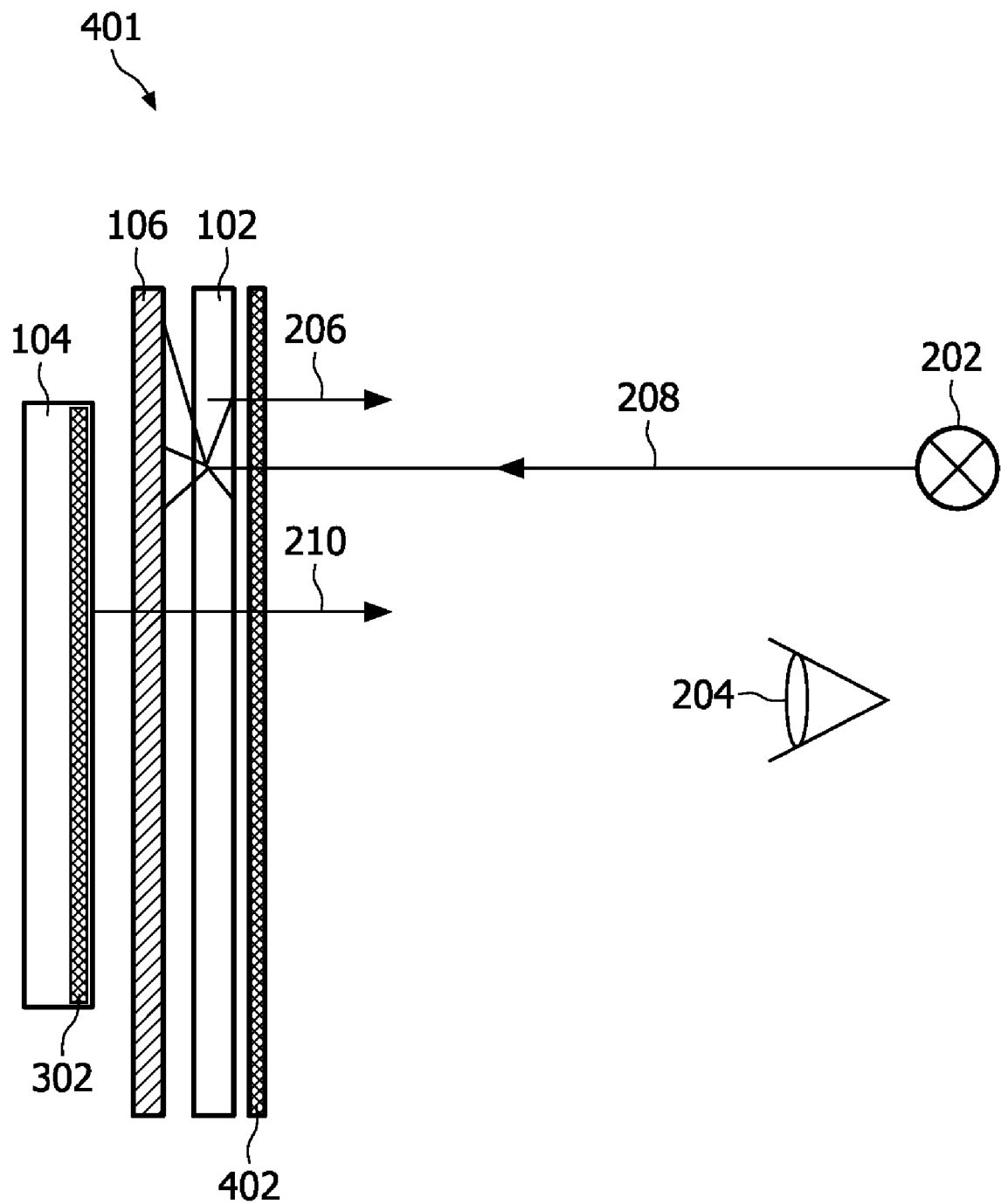
FIG. 4B schematically shows an embodiment of the display apparatus according to the invention comprising an absorption polarizer disposed in front of the scattering layer.

FIG. 4B schematically shows an embodiment of the display apparatus 401 according to the invention comprising an absorption polarizer 402 disposed in front of the scattering layer 102. This embodiment of the display apparatus 401 is substantially equal to the embodiment of the display apparatus 400 as described in connection with FIG. 4A. The difference is the position of the absorption polarizer 402.

Preferably, the absorption polarizer 402 as described in connection with FIG. 4A and FIG. 4B is a switchable absorption polarizer. The function and position of the switchable absorption polarizer corresponds to what is disclosed in patent application WO03/079318 as filed by the same applicant.

Figure 5:
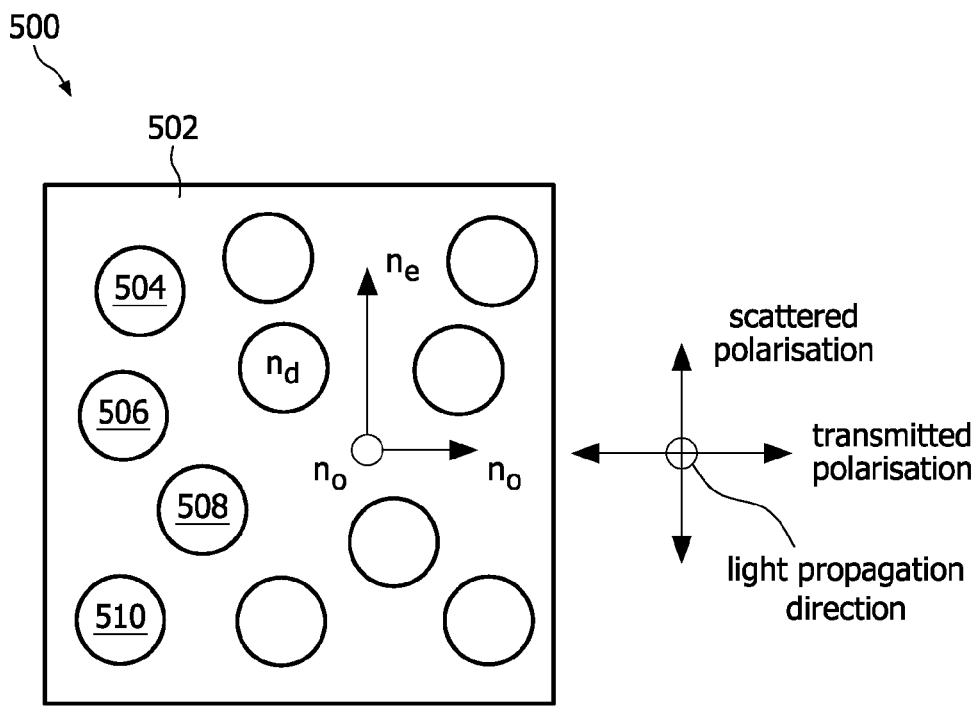
FIG. 5 schematically shows a scattering polarizer.

FIG. 5 schematically shows a scattering polarizer 500. A scattering polarizer 500 is a material which has different behaviors for respective polarization directions. The scattering polarizer is substantially transparent for light having a first polarization direction D1 and is arranged to scatter light having a second polarization direction D2 which is orthogonal with the first polarization direction D1. An example of the scattering polarizer is described in the PhD thesis of Henri Jagt, "Polymeric polarization optics for energy efficient liquid crystal display illumination", 2001, Chapter 2 and in patent application WO01/90637.

A scattering polarizer 500 can be based on particles 504-510 embedded in a polymer matrix 502. Blending small particles 504-510 with a known polymer 502 like e.g. PEN or PET, followed by extrusion of this mixture to a foil and stretching this foil, makes the scattering polarizer 500. The stretching provides uniaxial orientation, making it transparent for the first polarization direction D1 whereas it is scattering for the orthogonal second polarization direction D2.

The principle of the scattering polarizer 500 is as follows. The small particles 504-510, depicted as white circles, correspond to a dispersed phase with reflective index nd in a uniaxialy oriented polymer matrix 502 with a first polymer reflective index no for light having a first polarization direction D1 and a second polymer reflective index ne for light having a second polarization direction D2. The refractive index nd of the particles 504-510 is matched to the first polymer refractive index no, whereas the second polymer refractive index $n_e \gg n_d$.

The scattering polarizer 500 may be based on small particles embedded in a non-colored stretched foil. The particles may be e.g. core-shell particles (Rohm and Haas, Paraloid EXL 3647) having a diameter of 200 nm and consisting of a styrene-butadiene (S-BR) rubbery core and a poly(methylmethacrylate) (PMMA) shell. In order to add color, a dye or pigment can be added either to the particles 504-510 or to the polymer matrix 502. When the dye is added to the polymer matrix 502 also a dichroic dye can be selected that orient itself with the aligned polymer matrix 502 such that especially the polarization parallel to the stretching direction becomes colored, but the scattering polarizer 500 remains transmissive for first polarization direction D1.

Rather than using spherical particles the particles might have also other shapes, for instance elongated. In one embodiment the particles have a fiber-like shape obtained by melting and elongation of the initially spherical particles during the stretching process of the polymer matrix material.

As explained above a scattering polarizer 500 may be applied as scattering layer 102 or as reflecting layer 106. Optionally, an embodiment of the display apparatus according to the invention comprises a single scattering polarizer 500 which both fulfils the scattering and reflection function, i.e. the scattering layer 102 and the reflecting layer 106 are both realized by a single scattering polarizer 500.

Figure 6:
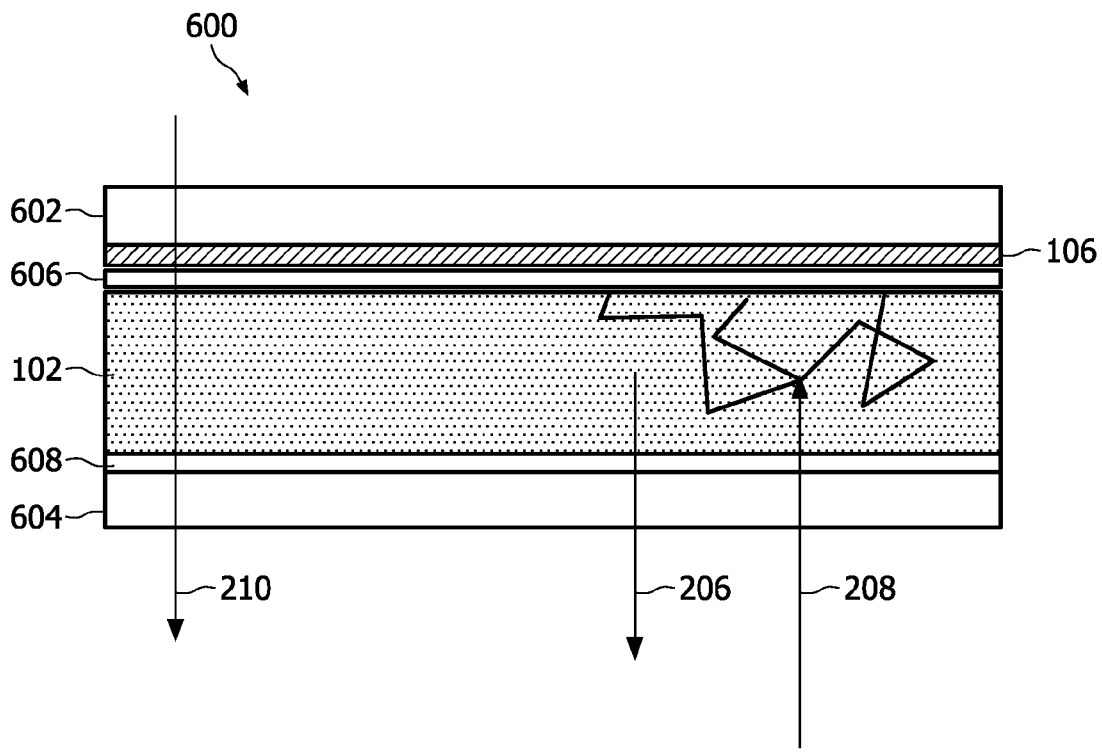
FIG. 6 schematically shows a scattering device comprising the scattering layer.

FIG. 6 schematically shows a scattering device 600 comprising a scattering layer 102. A scattering device 600 is arranged to control the amount of scattering of light by the scattering layer 102. The scattering device 600 comprises:
- a set of substantially flat substrates 602-604, e.g. based on glass, PMMA or some other substantially transparent material;
- a set of electrical conductors 606-608 adjacent to the respective substrates 602-604 acting as electrodes for applying a voltage difference. The electrical conductors are substantially transparent and preferably based on ITO; and
- a scattering layer 102 being sandwiched by the set of electrical conductors 606-608.

The scattering layer 102 preferably comprises Polymer Dispersed Liquid Crystals (PDLC), Cholesteric Texture Liquid Crystals (CTLC), Liquid Crystal (LC) gels or polymer network Liquid Crystal (PNLC). By applying the appropriate voltage difference on the electrical conductors 606-608, i.e. across the scattering layer 102 the orientation of the liquid crystals can be modified, resulting in an increase or decrease of the amount of light scattering by the scattering layer 102.

To indicate the function of the scattering device 600 in the display apparatus according to the invention the direction of the display light 210, the direction of the ambient light 208 and the direction of the scattered ambient light 206 are depicted.

It is preferred that the distance between the reflecting layer 106 and the scattering layer 102 is as small as possible. The scattering device 600 as depicted in FIG. 6 comprises the reflecting layer 106. This is a so-called in-cell configuration. The reflecting layer 106 could be the electrode (as in wire grids). It should be noted that the reflecting layer 106 is optional for the scattering device 600. That means that a scattering device not including the reflecting layer 106 but being adjacent to the reflecting layer 106 could also be applied in an embodiment of the display device according to the invention. To fulfill the requirements of having a relatively small distance between reflective layer 106 and the scattering layer 102 and the reflective layer 106 being not included in the scattering device, the substrate 602 which is adjacent to the reflective layer 106 must be relatively thin. Preferably, a reflective index matching fluid, i.e. glue is applied to realize the optical contact between the reflective layer 106 and the scattering device 600.

In order to switch the scattering layer 102 partially, e.g. over a surface area with dimensions equal to those of the display device 104 behind it or equal to only a portion of that, the substrates 602-604 of the scattering device 600 may contain patterned electrodes. The patterned electrodes can be use to open and close the display area in a discrete way. But it may also be used to open the display area only partially or to apply a gradient in hiding power such that the image of the display device 104 is revealed in an aesthetic way.

Optionally, the scattering device 600 is arranged to open a portion of the display area, i.e. make a portion of scattering layer 102 substantially transparent, which corresponds to an aspect ratio which differs from the aspect ratio of the display device 104.

Preferably, the scattering device 600 is configured to make only a first portion of the scattering layer 102 substantially transparent at a first moment of time, the first portion having dimensions which substantially correspond a first image being displayed on the display device 104 at the first moment of time, the first image having a first aspect ratio and the scattering device 600 is configured to make only a second portion of the scattering layer 102 substantially transparent at a second moment of time, the second portion having dimensions which substantially correspond a second image being displayed on the display device 104 at the second moment of time, the second image having a second aspect ratio.

Figure 7:
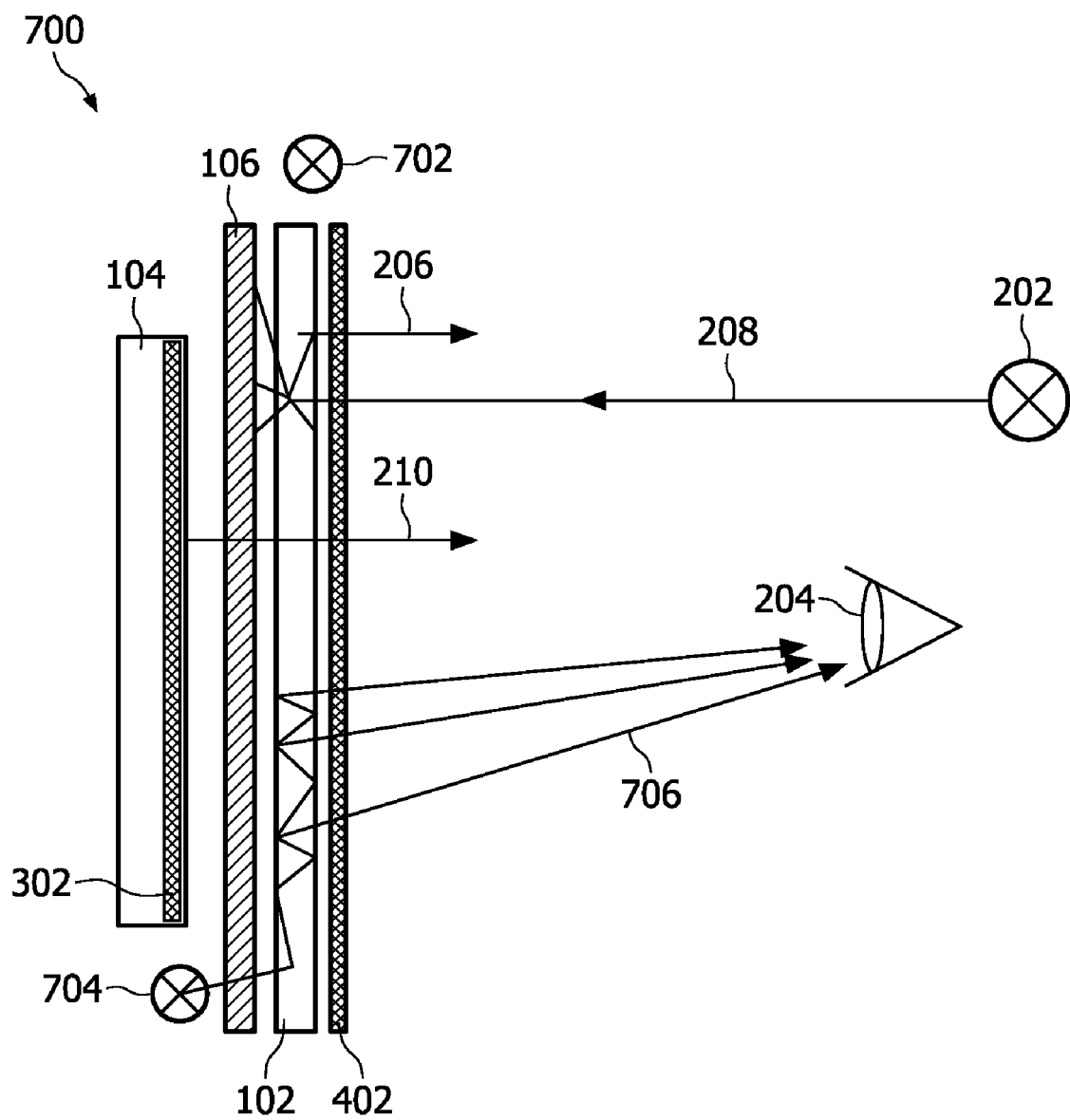
FIG. 7 schematically shows an embodiment of the display apparatus according to the invention comprising additional light sources at the borders of the scattering layer.

FIG. 7 schematically shows an embodiment of the display apparatus 700 according to the invention comprising additional light sources 702-704 at the borders of the scattering layer 102. The word "additional" is used to distinguish from the display device 104, which also comprises a light source. This embodiment of the display apparatus 700 according to the invention is arranged to emit light being generated by the light additional light sources 702-704 by means of the scattering layer 102. That means that light from the additional light sources 702-704 is coupled into the scattering layer 102, scattered by the scattering layer 102 and subsequently emitted at several locations at the surface of the scattering layer 102. A portion of that light 706 will be emitted in the first direction, i.e. towards the viewer 204.

The operation of the light sources 702-704 may be simultaneous with the operation of the display device 104. The result is an increased user experience if the control of the light is based on the video content, which is displayed at display device 104. For instance flashlights may be visualized by means of the additional light sources 702-704. Preferably, the scattering device 600 is also controlled in dependence of the video content, which is displayed at the display device 104.

Alternatively, the operation of the light sources takes place in the turned off state of the display device. The result is an increased amount of the light in the first direction, resulting in a further decrease of the "black hole" effect.

In FIG. 7 two additional light sources 702-704 are depicted, being located at respective borders of the scattering layer 102. A first one of the additional light sources 704 is located behind the scattering layer 102, while a second one of the additional light sources 702 is located more distant.

Preferably, multiple light sources 702-704 being arranged to generate light with mutually different colors are used.

FIG. 8A schematically shows the passing of light rays in an embodiment of the display apparatus according to the invention, where the display device 102 is turned off. The display device 102 is an LCD device. The scattering layer 102 is part of an active scattering device, which is put in state of maximum scattering. The scattering layer 106 is a reflective polarizer. In FIG. 8A is depicted that ambient light 208 which has first components having the first polarization direction D1 and second components having the second polarization direction D2 moves towards the scattering layer 102. A relatively small first portion 205 of the ambient light will be directly scattered back. (e.g. 15%) Both first components and second components will be comprised in that relatively small portion 205. A second portion of the ambient light is scattered towards the display device 104. From that second portion the light having the first polarization direction D1 passes the reflection layer 106 and is absorbed by the LCD device, while the light 206 having the second polarization direction D2 is reflected back.

FIG. 8B schematically shows the passing of light rays in the embodiment of the display apparatus according to the invention as described in connection with FIG. 8A, whereby the display device is turned on. The amount of scattered ambient light 205 and reflected scattered ambient light 206 is much lower now. FIG. 8B clearly shows that the display light 210 emitted by the display device, having the first polarization direction D1 can pass the reflection layer 106 and the scattering layer 102 without any substantial effect.

The image display apparatus according to the invention may be a television or monitor. The image display apparatus may be used by consumers at home. Alternatively, the image display apparatus is applied in a vehicle or at a public location like a shop or an office.

In the above, the basic concept behind the present invention has been explained. In the following, some further preferred elaborations will be explained.

Figure 9:
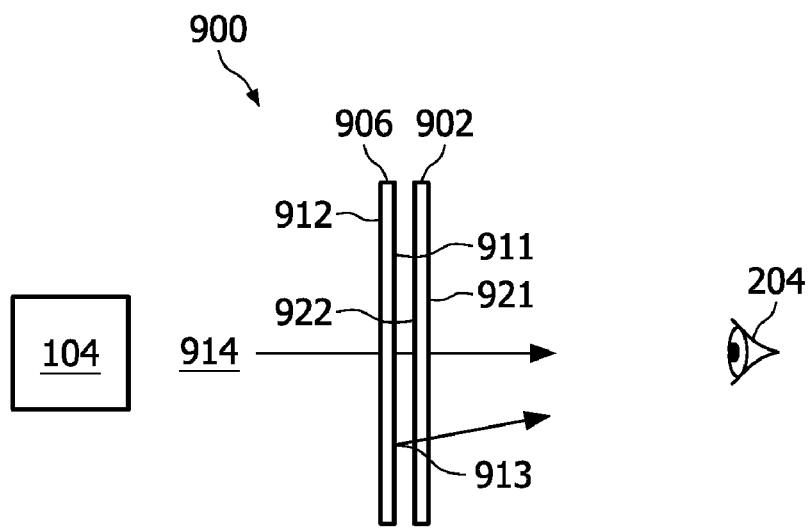
FIG. 9 is a schematic cross-section of a disguising device.

FIG. 9 is a schematic cross-section of a disguising device 900 suitable for use in an image display apparatus as described in the above. The device 900 comprises a reflective member 906 and a scattering device 902. The reflective member 906 has a planar shape of substantially uniform thickness. A first surface of the reflective member 906 which in use will be directed to a viewing person 204 will be indicated as front surface 911. A second surface opposite the first surface 911, which in use will be directed to a display screen 104, will be indicated as back surface 912 of the reflective member 906. Likewise, the scattering device 902 has a front surface 921 which in use will be directed to a viewing person 204, and a back surface 922 directed to the reflective member 906.

One desired property of the reflective member 906 is that it should reflect incident ambient light rays 913, impinging on the front surface 911; ideally, the reflectivity is 100%. Another desired property of the reflective member 906 is that it should be transparent for light rays 914 coming from a display screen 104, so that such light rays 914 pass towards the viewing person 204 substantially without hindrance; ideally, the transparency is 100%. In practice, it is difficult to combine these two desired properties, and a practical reflective member 906 will have a reflectivity less than 100% and a transparency less than 100%, wherein increased reflectivity will usually be correlated to decreased transparency. Thus, a practical reflective member 906 will be designed as a trade-off, with a view to "suitable" reflectivity and "acceptable" transparency. In this respect, one should realize that an increased reflectivity will correspond to increased hiding power (i.e. the higher the reflectivity, the better the screen 104 is hidden from view when the screen is OFF) but, on the down side, decreased transparency will reduce the light intensity of the screen 104 when the screen is ON, which may have to be compensated by increasing the emissive power of the display screen; this would, however, involve higher energy consumption.

The present invention aims to improve the hiding power of disguising device when the screen 104 is OFF while reducing the energy consumption of the screen 104 when the screen 104 is ON.

According to the present invention, the disguising device 900 comprises a substantially transparent, plate-shaped light source 950, arranged in parallel to the scattering layer 902 and preferably optically coupled to the scattering layer 902. The plate-shaped light source 950 has a front surface 951 which in use will be directed to a viewing person 204, and a back surface 952 directed to the display 104. In the embodiment illustrated in FIG. 10A, the plate-shaped light source 950 is arranged at the back-side of the scattering layer 902, i.e. the front surface 951 of the plate-shaped light source 950 is optically coupled to the back surface 922 of the scattering layer 902. In the embodiment illustrated in FIG. 10B, the plate-shaped light source 950 is arranged in front of the scattering layer 902, i.e. the back surface 952 of the plate-shaped light source 950 is optically coupled to the front surface 921 of the scattering layer 902.

The operation is as follows. When the screen 104 is OFF and the disguising device 900 is in its ornamental state where it substantially hides the screen 104 from view, the plate-shaped light source 950 is switched ON. In the case of the FIG. 10A, light emanating from the plate-shaped light source 950 will be coupled into the scattering layer 902, over the entire surface of the scattering layer 902, as illustrated by arrows 961, and is scattered forward by the scattering layer 902 towards the viewer 204, as illustrated by arrows 962. In the case of the FIG. 10B, light emanating from the plate-shaped light source 950 will be coupled into the scattering layer 902, over the entire surface of the scattering layer 902, as illustrated by arrows 963, and is scattered back by the scattering layer 902 through the transparent plate 950 towards the viewer 204, as illustrated by arrows 964. As a result, in both cases, the viewer 204 will observe the scattering layer 902 as having a slightly milky appearance, hiding the screen 104.

Figures 10A, 10B:
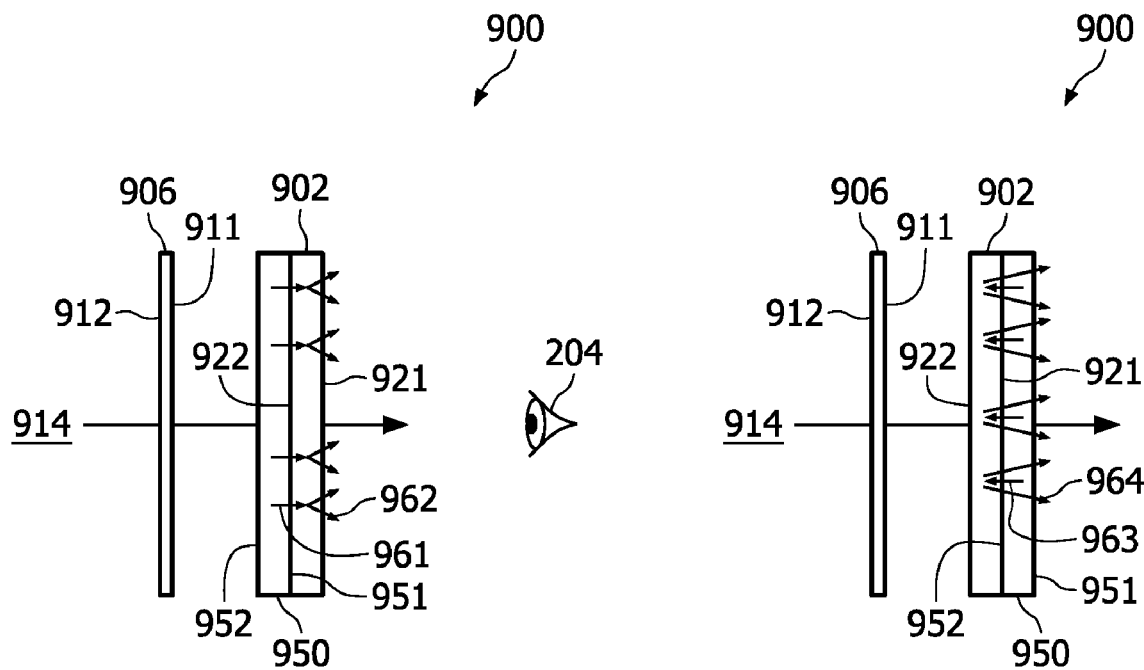
FIGS. 10A and 10B are schematic cross-sections of embodiments of a disguising device according to the present invention.

It is noted that in the case of FIG. 10A, any light rays directed from the plate-shaped light source 950 towards the reflective member 906 will be largely reflected back by the reflective member 906, pass the plate 950 in view of its transparency, and enter the scattering layer 902 to thus contribute to the scattering. It is further noted that in the case of FIG. 10B, any light rays passing the scattering layer 902 to reach the reflective member 906 will be largely reflected back by the reflective member 906 and re-enter the scattering layer 902 to thus contribute to the scattering.

The embodiment illustrated in FIG. 10A has an advantage over the embodiment illustrated in FIG. 10B in that it is more robust against unwanted forward scattering, as may be caused for instance by dust particles on the outer front surface.

When the screen is ON, the plate-shaped light source 950 may be switched off, and/or the scattering layer 902 may be switched to a non-scattering state, so that the viewer 204 is not hindered by scattered light 962, 964. Light 914 from the screen 104 will not be obstructed by the plate-shaped light source 950 because of its transparency.

Thus, in the OFF state of the screen 104, the hiding effect of the disguising device 900 no longer depends on the ambient light only but is enhanced by the additional light from the plate-shaped light source 950, while there is substantially no obstructing effect on the light 914 from the screen 104 in its ON state.

In view of the increased hiding effect, it is possible to reduce the reflectivity of the reflective member 906. Consequently, the transmissivity of the reflective member 906 will be increased, so that the light intensity of the screen 104 in its ON state may be reduced, thus reducing the power consumption. In fact, it will even be possible to omit the reflective member 906 entirely.

The plate-shaped light source 950 may be suitably implemented as a passive plate having scattering properties and being provided with one or more light sources arranged along its perimeter. Preferably, the plate-shaped light source 950 is switchable between two states, i.e. a scattering state and a non-scattering state, so that the scattering properties can be switched off in order to minimize disturbances when the screen 104 is ON.

However, it is also possible that the plate-shaped light source 950 is implemented as an active light source, actually generating light itself. By way of example, the plate-shaped light source 950 may be implemented using organic LEDs.

Preferably, the scattering layer 902 is a switchable layer having two states, i.e. a scattering state and a non-scattering state in which the layer 902 is substantially transparent.

Figure 11A:
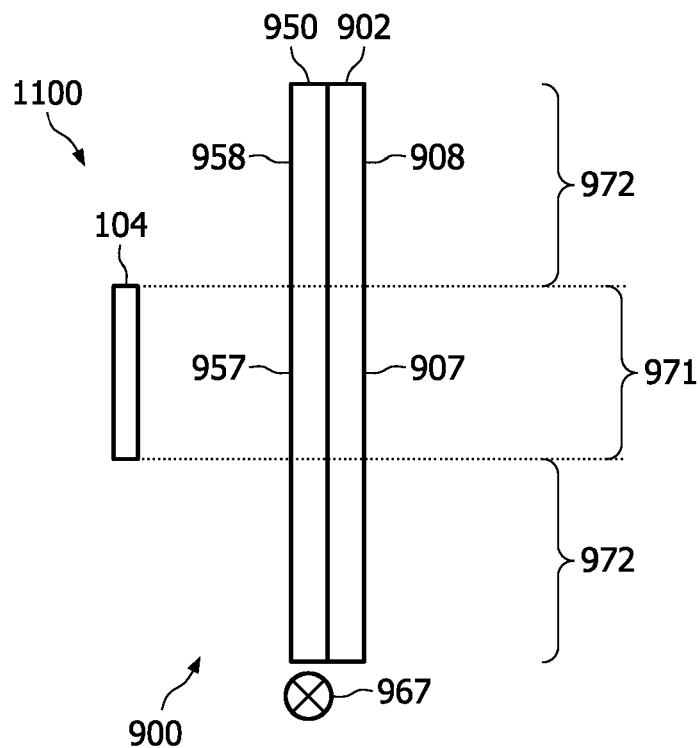
FIGS. 11A and 11B schematically illustrate preferred details of the disguising device.

FIG. 11A schematically illustrates a preferred embodiment of an image display apparatus 1100, comprising the display screen 104 and the disguising device 900, in the embodiment of FIG. 10A, although it should be clear that the following also applies to the embodiment of FIG. 10B. The figure shows that the size of the disguising device 900 is larger than the size of the screen 104, so that the disguising device 900 comprises a central part 971 aligned with the screen 104 and a peripheral part 972 outside the central part. Corresponding central parts of the plate-shaped light source 950 and the scattering layer 902 will be referred to as central part 957 of the plate-shaped light source 950 and central part 907 of the scattering layer 902, respectively. Corresponding peripheral parts of the plate-shaped light source 950 and the scattering layer 902 will be referred to as peripheral part 958 of the plate-shaped light source 950 and peripheral part 908 of the scattering layer 902, respectively.

In an ornamental mode, when the screen 104 is OFF, the entire disguising device 900 is producing scattered light 962 or 964 towards the viewer 204, i.e. both the peripheral part 972 and the central part 971. In order to minimize contrast differences, it is preferred that the backside of the peripheral part 972, i.e. the outer surface directed towards the screen 104, is provided with a black layer. In a display mode, when the screen 104 is ON, it may be that the user prefers a black frame around the screen 104; in that case, the entire disguising device 900 may be switched off, i.e. the entire scattering layer 902 may be switched to its non-scattering state and the entire plate-shaped light source 950 may be switched to its non-scattering state. Further, light sources 967 arranged along the edges of the plate-shaped light source 950 are switched off. If the plate-shaped light source 950 is an active light source, this plate-shaped light source 950 is switched off.

However, it is also possible that the user prefers a white (or whitish) frame around the screen 104. To allow for such possibility, the central part 971 of the disguising device 900 is switched off but the peripheral part 972 of the disguising device 900 remains switched on. Particularly, light sources 967 arranged along the edges of the plate-shaped light source 950 remain switched on, and the central part 907 of the scattering layer 902 is switched to its non-scattering state while the peripheral part 908 of the scattering layer 902 is switched to its scattering state. If the plate-shaped light source 950 is an active light source, its central part 957 and peripheral part 958 are preferably capable of being switched on/off independently from each other, so that in this case the central part 957 is switched off while the peripheral part 958 is switched on.

Figure 11B:
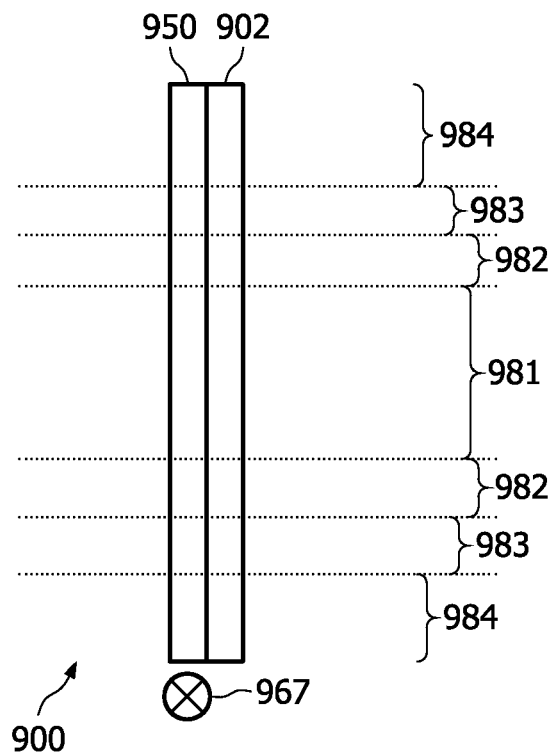

In the case of an image display apparatus 1100, disguising device 900 and screen 104 are adapted to each other, particularly as regards size. In the case of a separate disguising device 900, it is preferred that it can be combined with various screens of various sizes. Thus, the disguising device 900 preferably has multiple sections 981, 982, 983, 984, etc, as illustrated in FIG. 11B, capable of being switched on/off independently from each other, which can as desired be combined to constitute central part 971 or peripheral part 972 depending on the size of the screen 104 with which the disguising device 900 is to be combined.

An additional advantage of the present invention is that it is possible to use the disguising device (or a display screen provided with the disguising device) as a flat lamp.

Figure 12:
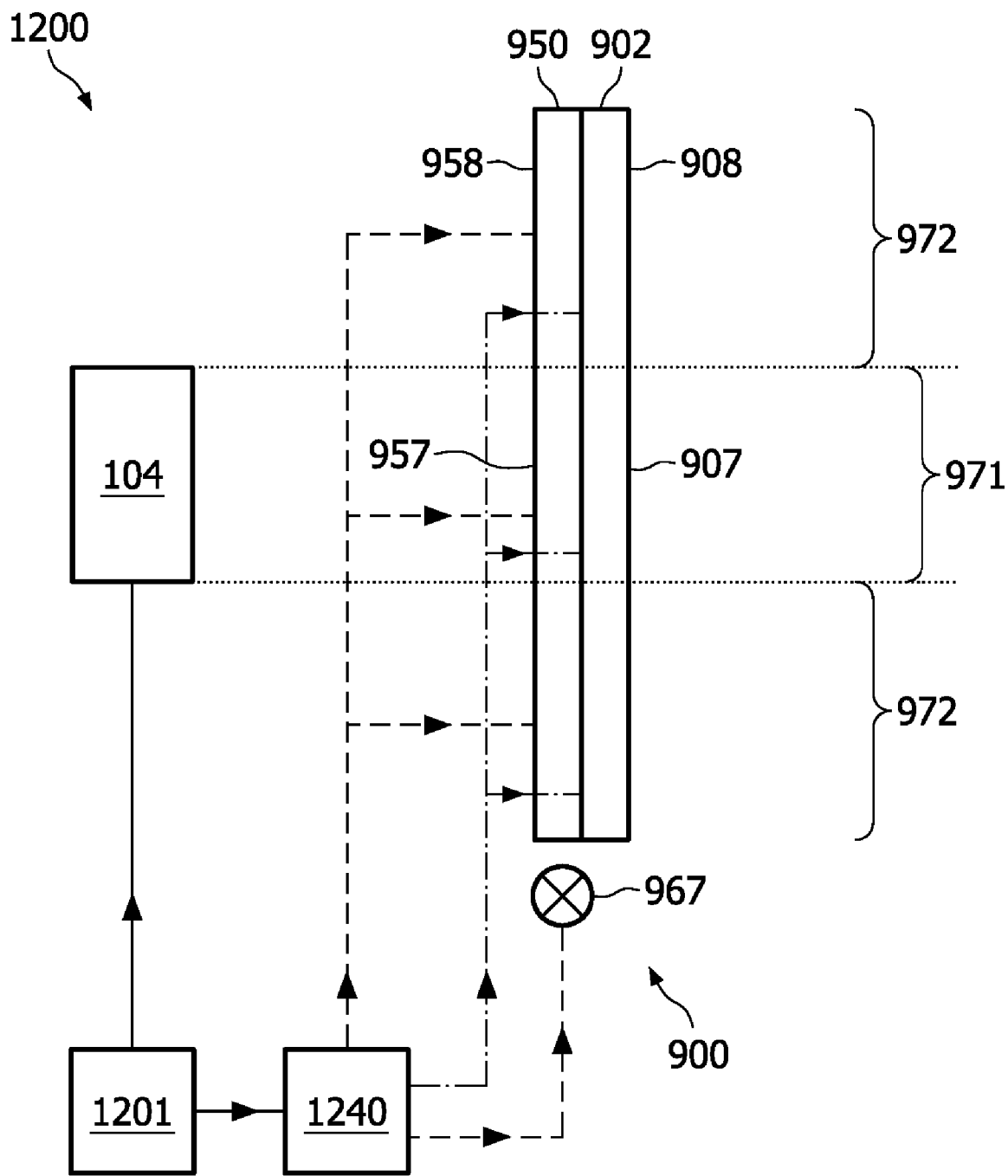
FIG. 12 is a block diagram schematically illustrating an image display apparatus with a controller and driver.

FIG. 12 is a diagram schematically illustrating an embodiment of an image display apparatus 1200, comprising the screen 104 and the disguising device 900. The image display apparatus 1200 further comprises a controller 1201 coupled to the display screen 104 for switching the screen 104 ON and OFF. This controller 1201 is also coupled to a disguise driver 1240. It is possible that the driver 1240 receives from the controller 1201 the same drive signal as the screen 104, or a separate drive signal, as shown. It is also possible that the driver 1240 and the controller 1201 are integrated. It is also possible that the driver 1240 cooperates with a sensor (not shown), detecting the ON/OFF status of the screen. It is further possible that the driver 1240 is responsive to a separate user control button or the like. In all these cases, either automatically in response to the screen 104 being switched ON or OFF or in response to a manual control command from the user, the driver 1240 generates drive signals for driving portions 957, 958 of the plate-shaped light source 950 and portions 907, 908 of the scatterer 902 either to a scattering state or to a non-scattering state, and for switching the peripheral lamps 967 ON and OFF.

In an OFF state of the apparatus 1200, the screen 104 and the peripheral lamps 967 are OFF, while the portions 957, 958 of the plate-shaped light source 950 and portions 907, 908 of the scatterer 902 are in their scattering state.

In an ornamental mode, the screen 104 is OFF, the peripheral lamps 967 are ON, while the portions 957, 958 of the plate-shaped light source 950 and portions 907, 908 of the scatterer 902 are in their scattering state.

In a display mode, the screen 104 is ON, the peripheral lamps 967 are ON, the peripheral portions 958 and 908 of the plate-shaped light source 950 and the scatterer 902 are in their scattering state, and the central portions 957 and 907 of the plate-shaped light source 950 and the scatterer 902 are in their non-scattering (i.e. transparent) state.

Figure 13A:
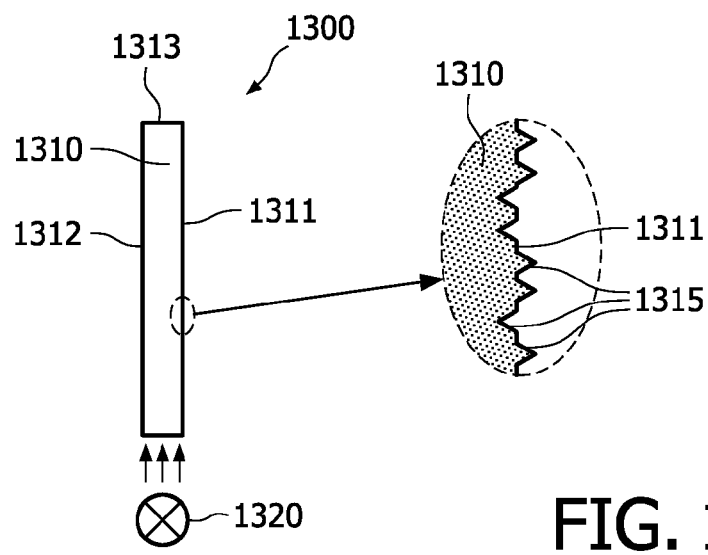
FIG. 13A schematically illustrates a plate-shaped light source.

FIG. 13A schematically illustrates, as a further elaboration of the present invention, a particularly advantageous embodiment of a substantially transparent, plate-shaped light source, indicated by reference numeral 1300, suitable to be used as the light source 950 mentioned above. The light source 1300 is implemented as a transparent light guide plate body 1310 with two substantially parallel main surfaces 1311, 1312 and a circumferential side face 1313. The plate body 1310 may for instance have a rectangular contour, in which case the side face comprises, in its upright condition shown in the figure, a lower face, upper face, lefthand face and righthand face. As far as light generation is concerned, the light guide plate body 1310 is typically passive, although it is possible that an active material is used.

The light source 1300 further comprises at least one active light generating element 1320, arranged at a predetermined location near the side face 1313 of the light guide plate body 1310. The active light generating element 1320 is advantageously implemented as a LED, but another embodiment, such as for instance a gas discharge tube, is also possible. If FIG. 13A is a side view, the figure shows the active light generating element 1320 located near the lower face part of the side face 1313. The side face 1313 of the light guide plate body 1310 is finished such that light from the light generating element 1320 enters the light guide plate body 1310 easily with little or no reflection.

For obtaining disguising properties, the light guide plate body 1310 should, as mentioned earlier, have scattering properties, i.e. should be coupled out of at least one of the main surfaces 1311, 1312, in a direction having a component perpendicular to the main surfaces 1311, 1312. For providing suitable scattering properties, the present invention proposes that at least one of the main surfaces 1311, 1312 is provided with permanent unevennesses or obtrusions 1315. The obtrusions 1315 may be implemented as material portions projecting from the surface 1311 (haut relief) or as indentations recessed in the surface (bas relief).

Figure 13B:
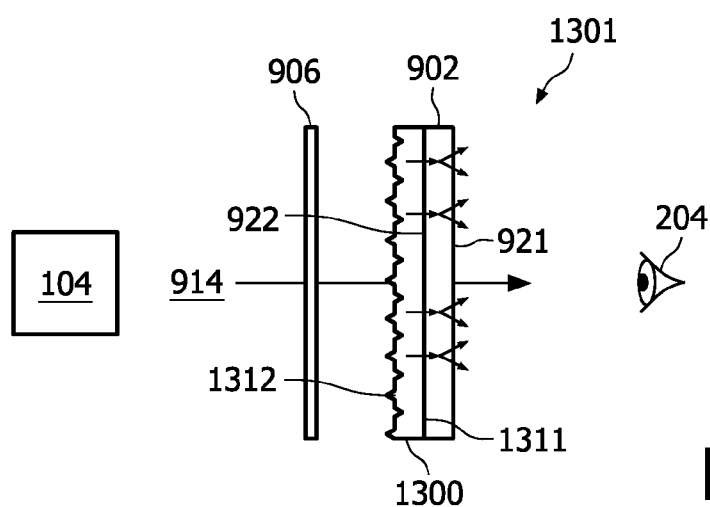
FIG. 13B is a figure comparable to FIG. 10A, schematically illustrating a disguising device with a plate-shaped light source according to FIG. 13A.

FIG. 13B is a figure comparable to FIG. 10A, schematically illustrating a disguising device 1301 comparable to the device 900 of FIG. 10A where the plate-shaped light source 950 is replaced by the light source 1300. Here, the light guide plate body 1310 has its front surface 1311 directed to the back surface 922 of the scattering device 902. Here it is the back surface 1312 of the light guide plate body 1310 that is provided with the obtrusions.

Figure 13C:
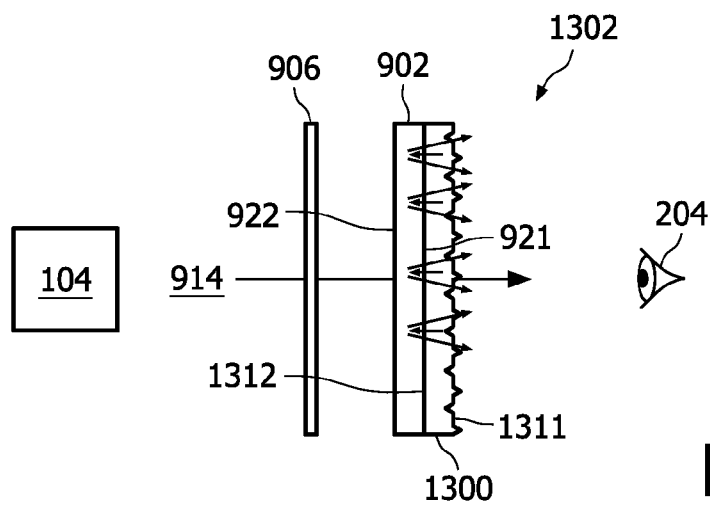
FIG. 13C is a figure comparable to FIG. 10B, schematically illustrating a disguising device with a plate-shaped light source according to FIG. 13A.

FIG. 13C is a figure comparable to FIG. 10B, schematically illustrating a disguising device 1302 comparable to the device 900 of FIG. 10B where the plate-shaped light source 950 is replaced by the light source 1300. Here, the light guide plate body 1310 has its back surface 1312 directed to the front surface 921 of the scattering device 902. Here it is the front surface 1311 of the light guide plate body 1310 that is provided with the obtrusions.

Thus, the main surface with obtrusions is directed away from the scattering device 902. It is noted that in the above cases the scattering device 902 is preferably located close to, possibly even in contact with the plate-shaped light source 950, yet without being optically coupled, in situations where the combination of scattering protrusions and optical coupled would results in an outcoupling efficiency so high that it is difficult to achieve sufficient light intensity over the entire surface of the disguising device.

The obtrusions provide the scattering properties to the plate body 1310, or add to such properties. Thus, depending on the distribution over the corresponding surface 1311, 1312, said obtrusions improve the uniformity and efficiency of the disguising device 1302, 1301 in the situation when the light generating element 1320 is ON and the disguising device 1302, 1301 is in its ornamental state.

The obtrusions 1315 may be distributed evenly and uniformly over the corresponding surface 1311, 1312. However, it is also possible that the obtrusions 1315 are distributed according to a certain pattern to define a graphical image, for instance a photo. The obtrusions 1315 may be implemented as a dot pattern, wherein the density and/or size of the dots may vary over the surface 1311, 1312. An example of a suitable method for providing the obtrusions 1315 is sandblasting, wherein a mask may be used to provide the desired variation of density or other decoration preferences.

It is noted that Japanese patent application 1999-223805 to Nissha Printing Co Ltd, publication number 2001-052519, discloses the use of a light guide plate as a backlight for a display. The light guide plate comprises two non-parallel surfaces, one surface being provided with non-mirror projections having a diameter of less than 20 μm and having a cross-sectional shape according to a part of a circle. Adjacent the light guide plate, facing the projections, the device comprises a mirror plane. Light is inputted at a side of the plate, and partially outputted by the projections. Light outputted by a projection is reflected by the mirror, passes the width of the light guide plate and is finally outputted at the surface opposite the projections. Such device is not transparent in the OFF state, and is therefore not suitable as a disguising device in accordance with the principles of the present invention.

In a specific experimental embodiment, the plate body 1310 was made from glass and the obtrusions were made by sandblasting in a dot pattern. The size of the dots (diameter of substantially circular dots) was varied, and the density of the dots was varied.

It was found that undesirable visibility in the display state (i.e. when the disguising device should be transparent) increases with increasing dot size. In this respect, dot sizes larger than 0.4 mm were found to involve undesirable visibility, so that dot sizes smaller than 0.4 mm are preferred. In general, the preferred range of dot sizes is between 20 and 200 μm, which sizes can well be achieved using sandblasting. Dot sizes of approximately 0.1 mm were found to give very satisfying results. Smaller dot sizes may also give good results, and may even be preferred in view of reduced visibility, but it is more difficult to make predefined patterns in view of the necessity to use a mask.

Further, it was found that the dot density greatly influences the luminance of the plate-shaped light source 1300, and hence the hiding performance in the ornamental state. When a region of the plate body 1310 has higher dot density, more light is coupled out of the plate body 1310, so a higher local luminance and better hiding performance is achieved in that region. On the other hand, because more light is coupled out, less light remains beyond such region, so the luminance at larger distances from the light generating element 1320 may be reduced, reducing the hiding performance in the ornamental state. For a dot size of 0.1 mm, a dot density in the range between 5 and 500 dots/cm$^2$ appeared to provide a suitable tradeoff.

In the above, disguising devices have been described comprising a combination of a reflective member and a scattering layer, wherein the scattering layer is provided with a plate-shaped light source. All in all, the combination of the scattering layer and the plate-shaped light source serves to provide a diffuse glare of light over the area of the disguising device, suitable to hide objects from view for a human observer. Both the scattering layer and the plate-shaped light source serve basically different purposes. Starting from the scattering layer, which itself already has a hiding performance because it scatters ambient light, the plate-shaped light source adds more or less diffuse light to the scattering layer, to increase the luminance of the scattering layer. Starting from the plate-shaped light source, which provides more or less diffuse light, the scattering layer serves to further scatter this light and make it even more diffuse and further increases luminance by scattering ambient light. So both components support and supplement each others function. However, because the plate-shaped light source already provides more or less diffuse light, this plate-shaped light source already has a hiding performance, and with a suitable design it is possible that the hiding performance of the plate-shaped light source by itself is already sufficient so that the separate scattering layer may be omitted.

The above applies for an active plate-shaped light source, for instance implemented by using organic LEDs or by inorganic thin film electroluminescence layers, but also for a passive plate-shaped light source, such as described for instance with reference to FIGS. 13A-13C. Based on this understanding, FIGS. 14A-14D schematically illustrate disguising devices where the separate scattering layer is omitted.

Figures 14A, 14B:
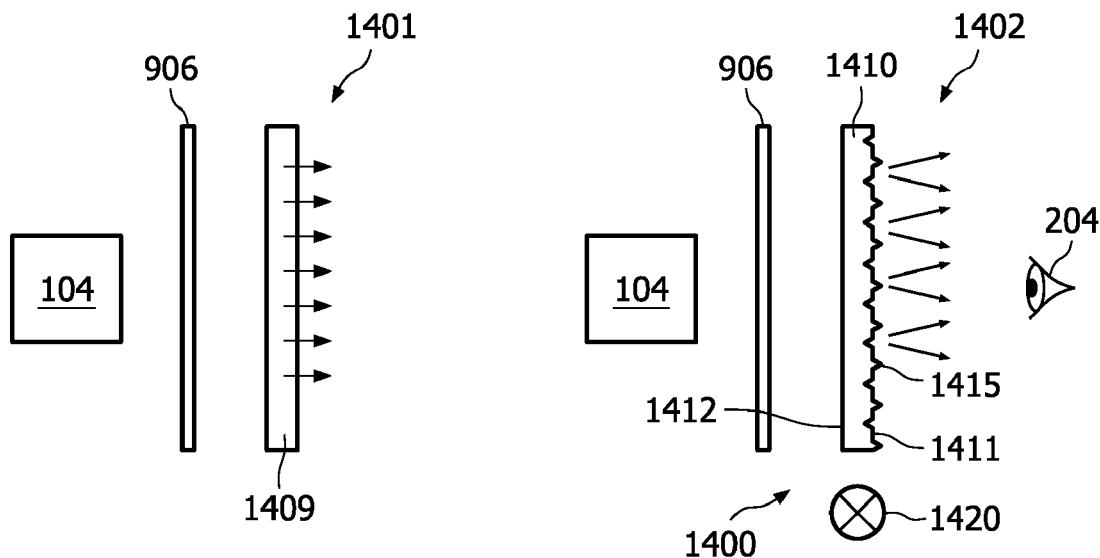
FIGS. 14A-14D schematically illustrate different embodiments of disguising devices.

In FIG. 14A, a disguising device 1401 comprises the combination of a reflective member 906 with an active plate-shaped light source 1409.

In FIG. 14B, a disguising device 1402 comprises the combination of a reflective member 906 with a passive plate-shaped light source 1400 comprising a plate body 1410 having obtrusions 1415 at its front surface 1411 directed towards an observer 204. A device having such orientation has a higher light efficiency as compared to the device of FIG. 14C.

Figures 14C, 14D:
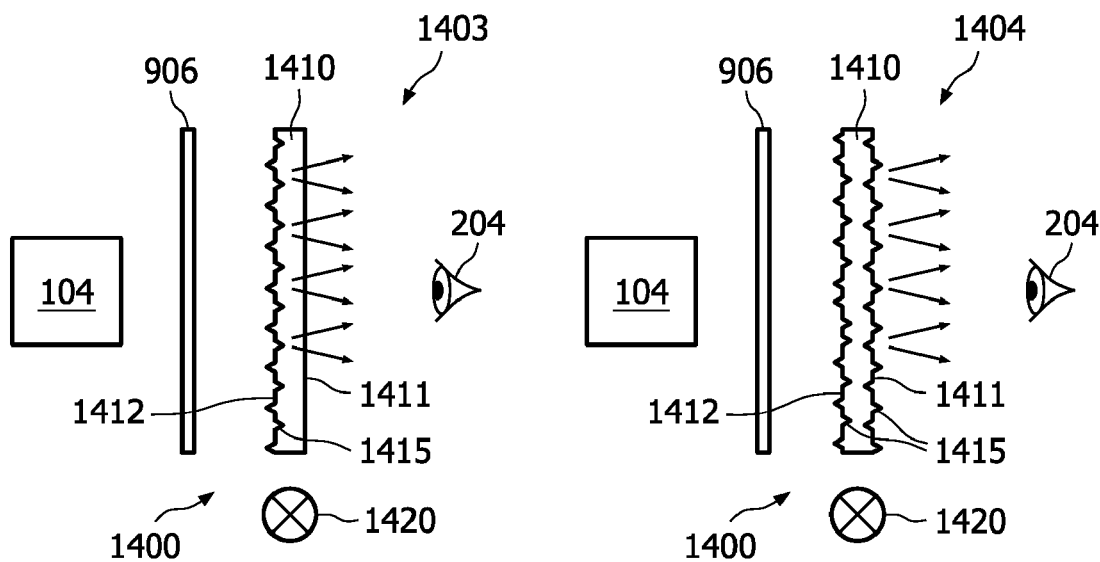

In FIG. 14C, a disguising device 1403 comprises the combination of a reflective member 906 with a passive plate-shaped light source 1400 comprising a plate body 1410 having obtrusions 1415 at its back surface 1412 directed towards a display 104. A device having such orientation is more robust against pollution as compared to the device of FIG. 14B.

In FIG. 14D, a disguising device 1404 comprises the combination of a reflective member 906 with a passive plate-shaped light source 1400 comprising a plate body 1410 having obtrusions 1415 both at its front surface 1411 and at its back surface 1412. Thus, the advantages of the embodiments 1402 and 1403 are combined. Further, it is possible to obtain special effect by arranging the obtrusions at the two different surfaces 1411 and 1412 in mutually different patterns.

In the embodiments 1402, 1403, 1404, a light-generating element is always indicated at 1420. For the plate body 1410 and the obtrusions 1415, the same applies as what has been mentioned in relation to the plate body 1310 and the obtrusions 1315 of FIGS. 13A-13C.

In the FIGS. 14A-14D, the disguising devices 1401-1404 are shown as comprising a reflective member 906, which may be a semitransparent or switchable mirror. Although such member may be advantageous and preferred, it is noted that this member is not essential for achieving an adequate disguising device.

In the above, embodiments of a disguising device have been described, including a plate-shaped light source and a switchable scatterer (see for instance FIGS. 9 and 10A-B), wherein the plate-shaped light source is implemented as a light guide plate with at least one light-generating element arranged at a side. As has also been indicated above, there may be a problem that the luminance at larger distances from the light-generating element may be reduced. This problem is explained with reference to FIG. 15, which shows a graph of which the horizontal axis represents the distance from the light-generating element 1320 in a light guide plate body 1310 (shown below the figure). The vertical axis represents the amount of light produced (i.e. coupled out) at a certain position. This amount may be represented as an absolute intensity per square centimeter, for instance, but it is easier to represent this amount as a percentage of the intensity of the light-generating element. Assuming the outcoupling efficiency p at a certain position (i.e. the percentage of the intensity of the light reaching that position that is coupled out) to be constant with the distance from the light-generating element, it should be clear that at each position i the amount $L_{OUT}(i)$ of light being coupled out and the amount of light INT(i+1) reaching the next position i+1 can be expressed as follows:

$$L_{OUT}(i) = p \cdot INT(i)$$

$$INT(i+1) = (1-p) \cdot INT(i)$$

Figure 15:
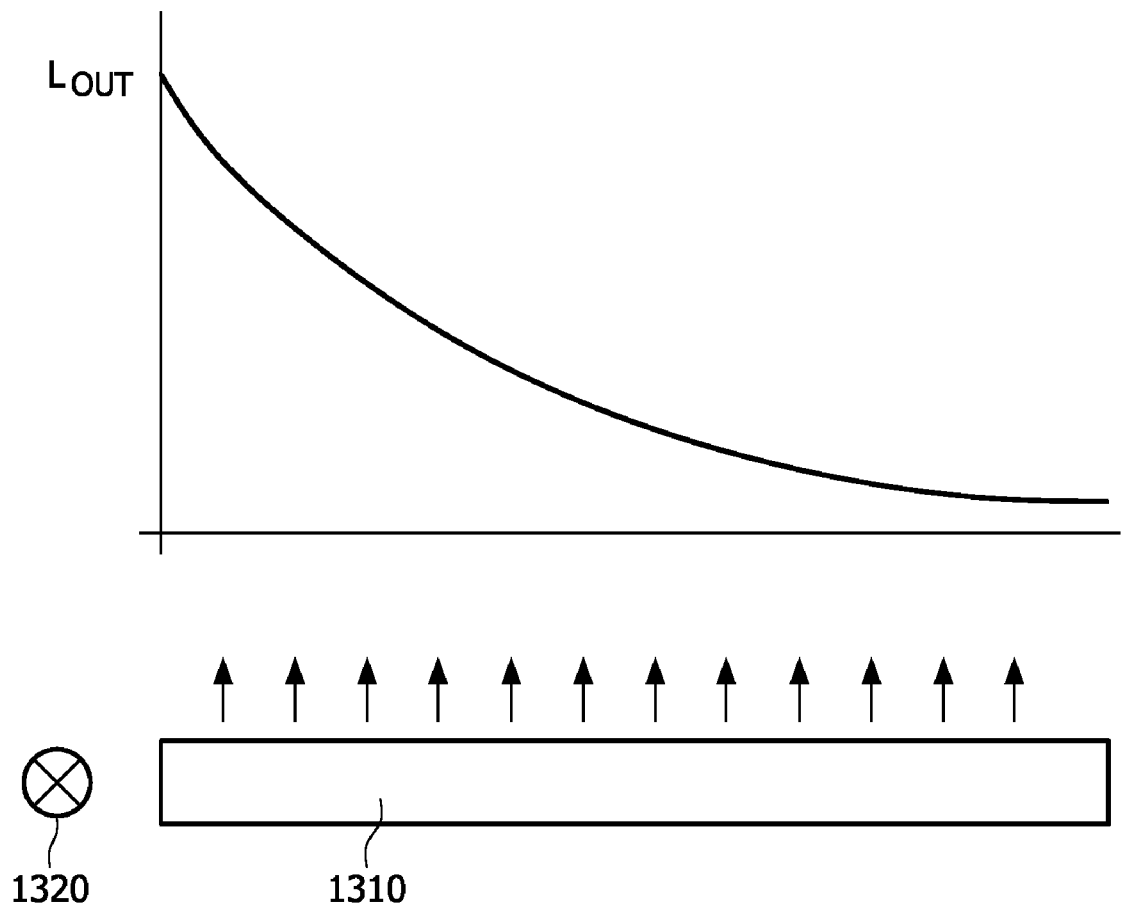
FIG. 15 shows a graph illustrating decline of luminance over a disguising device.

It should further be clear that $L_{OUT}(i)$ can thus graphically be represented as a logarithmic curve, as shown in FIG. 15.

If p is relatively small, the decline of $L_{OUT}(i)$ over the extent of the light guide plate body 1310 may be small enough to be unnoticeable or acceptable. However, the surface light intensity of the plate-shaped light source may be relatively small. If p is increased, the surface light intensity of the plate-shaped light source at locations close to the light-generating element (small values of i) will be increased, but unavoidably the surface light intensity of the plate-shaped light source at locations remote from the light-generating element will be increased to a lesser extent, or will even be decreased, depending on the size of the light guide plate body 1310. Thus, the decline of $L_{OUT}(i)$ over the extent of the light guide plate body 1310 will increase.

Thus, although the dot size and dot density is uniform, the light output may be non-uniform, and this may be unacceptable. To a certain extent, this problem can be reduced by making the dot size and/or the dot density non-uniform such as to increase the outcoupling efficiency p as a function of the distance from the light-generating element. Alternatively and/or additionally, it is possible to arrange light-generating elements at opposite sides of the light guide plate body.

Figure 16:
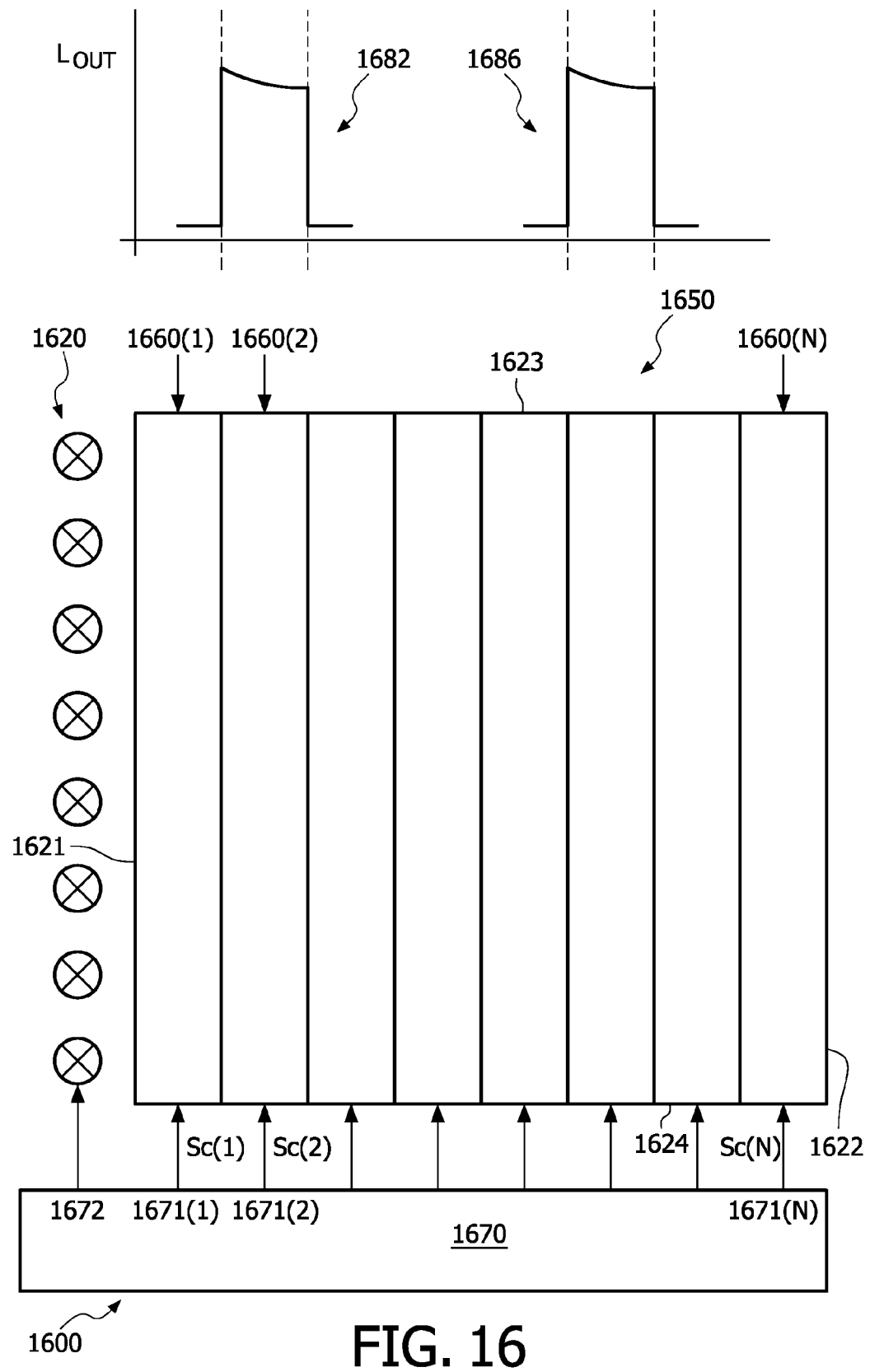
FIG. 16 schematically shows a block diagram of a disguising device with a graph schematically illustrating luminance for different segments of a scatterer.

FIG. 16 illustrates another approach according to the present invention. The figure schematically shows a front view of a switchable scatterer 1650 of a disguising device 1600. The disguising device 1600 also comprises a plate-shaped light source, located behind the scatterer 1650 and therefore not visible. The plate-shaped light source is a passive type, for instance implemented as described in the above, with its side illumination 1620 being shown at the lefthand side of the scatterer. A controller for controlling the switching of the switchable scatterer 1650 is indicated at 1670.

According to this aspect of the present invention, the switchable scatterer 1650 is subdivided into a plurality of longitudinal segments 1660, individual segments being identified by the index i, which ranges from 1 to N, N indicating the number of segments. The segments 1660 may mutually have the same width, but this is not essential. The longitudinal dimension of the segments 1660 is directed parallel to a light input side 1621, which is the side where the light generating element or elements 1620 is/are located. For increasing i, the distance from the light generating element(s) 1620 to the longitudinal segment 1660(i) is larger.

The scatterer segments 1660(i) are individually and independently switchable. The controller 1670 has scatterer control outputs 1671(1), 1671(2), . . . 1671(N) coupled to the respective scatterer segments 1660(1), 1660(2), . . . 1660(N).

As shown, the controller 1670 may also have a control output 1672 coupled to the light generating element or elements 1620.

The controller 1670 drives the scatterer segments 1660(*i*) in a time-sequential manner. More particularly, the controller 1670 generates control signals Sc(i) at its respective control outputs 1671(*i*) for the respective scatterer segments 1660(*i*) in such a way that one specific scatterer segment 1660(*j*) is in a scattering state while all other scatterer segments 1660(*i*), i≠j, are in a non-scattering state. Further, the controller 1670 maintains this state for a predetermined segment maintenance duration τ(j), and then continues to a next state where the subsequent specific scatterer segment 1660(*j*+1) is in a scattering state while all other scatterer segments 1660(*i*), i≠j+1, are in a non-scattering state. This is continued until all scatterer segments have been switched briefly to their scattering state, and then the cycle is repeated. In other words, the scattering state is scanned over the scatterer. The cycle duration T can be defined as Στ(j).

The number of scatterer segments will be at least equal to two, and may in principle have any value as desired. In the drawing, the number of segments is shown to be equal to 8.

An advantage of this approach is that the amount of light coupled out of the light guide plate body (e.g. 1310 in FIG. 13) is very low for those scatterer segments which are in their non-scattering state, and relatively high for the scatterer segment which is in its scattering state. The decline in light intensity as described above will only be observed over the width of the scatterer segment which is in its scattering state, and, depending on this width, such decline may be relatively low even at a relatively high value for p.

Of course, only the scatterer segment(s) which is/are in its/their scattering state has/have a disguising effect, while the other segments practically have no disguising effect. But this situation is momentarily, and lasts for the segment maintenance duration τ. At a time scale larger than the cycle duration T, all segments have partially been in a disguising state, and a disguising ratio can be defined as DR=τ(j)/T. If the cycle duration T is sufficiently short, for instance 10 ms or shorter, the sequential disguising or "scanning disguise" is hardly or not noticeable to the human eye. For each scatterer segment, the average output light amount can be written as DR·$L_{OUT}$. An important aspect is that this average output light amount can basically be the same for all segments. This is illustrated in the two curves in the graph aligned with the scatterer 1650 in FIG. 16, where one curve 1682 shows the light distribution when the second scatterer segment is in its scattering state (j=2) while another curve 1686 shows the light distribution when the sixth scatterer segment is in its scattering state (j=6). It can be seen that the light intensity of the sixth scatterer segment is at the same level as the light intensity of the second scatterer segment, which is due to the fact that the first to fifth segments hardly "consume" light.

The number of scatterer segments, or the width of the segments, can be selected to improve uniformity. Keeping the light intensity of the light-generating element 1620 constant, the decline per segment can be reduced by increasing the number of scatterer segments.

If the scatterer still suffers from loss of light for scatterer segments further away from the light generating element(s), it is possible to compensate this by having the segment maintenance duration τ(j) increase with increasing distance from the light generating element(s) (i.e. increasing j). It is also possible that the scattering segments do not merely allow for selecting a scattering state or a non-scattering state, but even allow for the efficiency p of the scattering to be controlled. In that case, loss of light can be compensated by having the controller control the segments such that the scattering efficiency p(j) increases with increasing distance from the light generating element(s) (i.e. for increasing j).

In the above explanation, it was assumed that the light intensity of the light-generating element(s) 1620 is constant with time. However, in the embodiment shown, the controller 1670 has a control output 1672 coupled to the light-generating element(s) 1620 for controlling the light intensity of the light-generating element(s) 1620. In that case, loss of light can be compensated by having the controller control the light-generating element(s) 1620 such that the light intensity is increased in proportion with increasing distance between the momentarily scattering segment 1660(*j*) and the light generating element(s) (i.e. for increasing j).

In the embodiment shown, the light-generating element(s) 1620 is/are arranged along one side 1621 of the disguising device 1600 only, and the scatterer 1650 is subdivided into a first plurality of individually controllable segments 1660 parallel to this one side, i.e. in a vertical direction in the figure. Light is assumed to propagate perpendicularly to this one side 1621 and said individually controllable segments 1660 only, i.e. in a horizontal direction in the figure. Uniformity can be improved by also having light-generating element(s) arranged along the opposite side 1622 of the disguising device 1600. Uniformity can be further improved if the scatterer 1650 is also subdivided into a second plurality of individually controllable segments perpendicular to the first plurality of segments, with second light-generating element(s) arranged along a third side 1623 perpendicular to the said one side 1621 of the disguising device 1600, and possibly further light-generating element(s) arranged along a fourth side 1624 opposite said third side 1623. For the time-sequential control of this second plurality of segments, the same applies as what has been mentioned in respect of the first plurality of segments, it being noted that the time-sequential control of this second plurality of segments may be entirely independent from the time-sequential control of said first plurality of segments.

Summarizing, the present invention provides an image display apparatus 100 comprising:

a display device 104 for displaying an image by emission of display light 210 in a first direction;

a scattering layer 902 disposed in front of the display device 104, for scattering at least a portion of ambient light 208;

a transparent plate-shaped light source 950, arranged parallel to the scattering layer 902 and being optically coupled to the scattering layer 902.

The plate-shaped light source 950 may be a passive light source, in which case at least one light source 967 is arranged along an edge of the plate-shaped light source 950.

When the display device 104 is ON, the scattering layer 902 and the plate-shaped light source 950 are transparent. When the display device 104 is OFF, the scattering layer 902 is scattering and the plate-shaped light source 950 is ON.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

The disguising device has been described as part of an image display apparatus, to disguise or hide from view a display screen of that apparatus. However, such disguising apparatus may also be provided as a separate device, to be placed in front of an existing display screen. Further, the disguising apparatus may also be useful in other applications for selectably hiding or showing objects. Such object may be actively light-emitting or not.

It is noted that the light sources 967 used in conjunction with the plate-shaped light source 950 may emit light of one color only, for instance white, but it is also possible that these light sources 967 emit light with variable color, so that it is possible to have the hiding light match the appearance of the wall; for instance, these light sources may be of RGB type.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope. Features described in relation to a particular embodiment can also be applied to other embodiments described.

The invention claimed is:

1. An image display apparatus, comprising:
a display device configured to display an image by emission of display light in a first direction;
a scattering layer disposed in front of the display device, configured to scatter at least a portion of ambient light in substantially random directions providing diffuse reflection of the portion of ambient light;
a transparent plate-shaped light source, arranged parallel to the scattering layer and optically coupled to the scattering layer, wherein the plate-shaped light source comprises a central portion aligned with the display device and at least one peripheral portion, each of those portions configured, independently from the other portions, to operate in either a scattering state or a non-scattering state.

2. The image display apparatus according to claim 1, further comprising a reflective member disposed between the scattering layer and the display device, configured to reflect at least a portion of the scattered ambient light and to pass at least a portion of the display light.

3. The image display apparatus according to claim 1, wherein the plate-shaped light source is arranged in front of the scattering layer.

4. The image display apparatus according to claim 1, wherein the plate-shaped light source is arranged at the backside of the scattering layer.

5. The image display apparatus according to claim 1, wherein the plate-shaped light source is a passive light source, and wherein at least one light-generating element is arranged along an edge of the plate-shaped light source.

6. An image display apparatus comprising:
a display device configured to display an image by emission of display light in a first direction;
a scattering layer disposed in front of the display device, configured to scatter at least a portion of ambient light in substantially random directions providing diffuse reflection of the portion of ambient light;
a transparent plate-shaped light source, arranged parallel to the scattering layer and optically coupled to the scattering layer, wherein the plate-shaped light source is an active light source.

7. The image display apparatus according to claim 1, wherein the scattering layer comprises a central portion aligned with the display device and at least one peripheral portion, each of those portions configured, independently from the other portions, to operate in either a scattering state or a non-scattering state.

8. An image display apparatus comprising:
a display device configured to display an image by emission of display light in a first direction;
a scattering layer disposed in front of the display device, configured to scatter at least a portion of ambient light in substantially random directions providing diffuse reflection of the portion of ambient light;
a transparent plate-shaped light source, arranged parallel to the scattering layer and optically coupled to the scattering layer, wherein the scattering layer comprises a central portion aligned with the display device and at least one peripheral portion, each of those portions configured, independently from the other portions, to operate in either a scattering state or a non-scattering state.

9. The image display apparatus according to claim 1, further comprising:
a driver configured to drive the disguise device and to switch the disguise device in accordance with an ON/OFF state of the display device.

10. A disguising device, comprising:
a scattering layer configured to scatter at least a portion of ambient light in substantially random directions to provide diffuse reflection of the portion of ambient light;
a transparent plate-shaped light source, arranged parallel to the scattering layer and optically coupled to the scattering layer, wherein the plate-shaped light source comprises a central portion aligned with the display device and at least one peripheral portion, each of those portions configured, independently from the other portions, to operate in either a scattering state or a non-scattering state.

11. The disguising device according to claim 10, further comprising a reflective member arranged in parallel to the scattering layer and having its reflective side directed to the scattering layer.

12. The disguising device according to claim 11, wherein the plate-shaped light source is arranged at the side of the scattering layer directed away from the reflective member.

13. The disguising device according to claim 11, wherein the plate-shaped light source is arranged between the scattering layer and the reflective member.

14. The disguising device according to claim 10, wherein the plate-shaped light source is a passive light source, and wherein at least one light source is arranged along an edge of the plate-shaped light source.

15. The disguising device according to claim 10, wherein the plate-shaped light source is an active light source.

16. The disguising device according to claim 10, wherein the scattering layer comprises a central portion and at least one peripheral portion, each of those portions configured, independently from the other portions, to operate in either a scattering state or a non-scattering state.

17. A disguising device comprising:
a display device configured to display an image by emission of display light in a first direction;
a scattering layer disposed in front of the display device, configured to scatter at least a portion of ambient light in substantially random directions providing diffuse reflection of the portion of ambient light;
a transparent plate-shaped light source, arranged parallel to the scattering layer and optically coupled to the scattering layer, wherein the scattering layer comprises a central portion and at least one peripheral portion, each of those portions configured, independently from the other portions, to operate in either a scattering state or a non-scattering state.

18. The image display apparatus according to claim 1, wherein the scattering layer comprises obtrusions on at least one surface receiving the portion of ambient light.

19. The disguising device according to claim 10, wherein the scattering layer comprises obtrusions on at least one surface receiving the portion of ambient light.

20. An image display apparatus, comprising:
a display device configured to display an image by emission of display light in a first direction;
a scattering layer disposed in front of the display device, configured to scatter at least a portion of ambient light;
a transparent plate-shaped light source, arranged parallel to the scattering layer and optically coupled to the scattering layer and comprising a central portion aligned with the display device and at least one peripheral portion, each of those portions configured, independently from the other portions, to operate in either a light-emitting state or a non-light-emitting state.

21. An image display apparatus, comprising:
a display device configured to display an image by emission of display light in a first direction;
a scattering layer disposed in front of the display device, configured to scatter at least a portion of ambient light and comprising a central portion aligned with the display device and at least one peripheral portion, each of those portions configured, independently from the other portions, to operate in either a scattering state or a non-scattering state;
a transparent plate-shaped light source, arranged parallel to the scattering layer and optically coupled to the scattering layer.

* * * * *